United States Patent
Gupta et al.

(10) Patent No.: US 11,855,770 B2
(45) Date of Patent: *Dec. 26, 2023

(54) AUTHENTICATION CONTROL BASED ON PREVIOUS ACTIONS

(71) Applicant: Capital One Services, LLC, McLean, VA (US)

(72) Inventors: Prateek Gupta, Bellerose, NY (US); Samuel Wu, Brooklyn, NY (US); Zachary Wyman, New York, NY (US); Ramiro Ordonez, Ho Ho Kus, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,769

(22) Filed: Nov. 30, 2021

(65) Prior Publication Data

US 2023/0164075 A1    May 25, 2023

Related U.S. Application Data

(63) Continuation of application No. 17/538,327, filed on Nov. 30, 2021, which is a continuation of application
(Continued)

(51) Int. Cl.
    *H04L 67/5682*      (2022.01)
    *G06N 20/00*      (2019.01)
(Continued)

(52) U.S. Cl.
CPC ......... *H04L 67/5682* (2022.05); *G06N 20/00* (2019.01); *H04L 45/742* (2013.01);
(Continued)

(58) Field of Classification Search
CPC ..... H04L 67/10; H04L 65/765; H04L 69/329; H04L 67/60; H04L 12/1827;
(Continued)

(56) References Cited

U.S. PATENT DOCUMENTS

| 6,385,693 B1 | 5/2002 | Gerszberg et al. |
| 7,047,411 B1 | 5/2006 | DeMello et al. |

(Continued)

FOREIGN PATENT DOCUMENTS

| EP | 3145159 A1 | 3/2017 |
| WO | 2008052340 A1 | 5/2008 |
| WO | 2017210123 A1 | 12/2017 |

OTHER PUBLICATIONS

Mar. 22, 2023 (WO) International Search Report and Written Opinion—App PCT/US2022/050360, 17 pages.

*Primary Examiner* — Djenane M Bayard
(74) *Attorney, Agent, or Firm* — Banner & Witcoff, Ltd.

(57) ABSTRACT

A system, process, and computer-readable medium for updating an application cache using a stream listening service is described. A stream listening service may monitor one or more data streams for content relating to a user. The stream listening service may forward the content along with time-to-live values to an application cache. A user may use an application to obtain information regarding the user's account, where the application obtains information from a data store and/or cached information from the application cache. The stream listening service, by forwarding current account information, obtained from listening to one or more streams, to the application cache, reduces traffic at the data store by providing current information from the data stream to the application cache.

17 Claims, 11 Drawing Sheets

Related U.S. Application Data

No. 17/533,618, filed on Nov. 23, 2021, and a continuation of application No. 17/533,773, filed on Nov. 23, 2021.

(51) Int. Cl.
  *H04L 45/74* (2022.01)
  *H04L 47/28* (2022.01)
  *H04L 49/20* (2022.01)
  *H04M 3/51* (2006.01)

(52) U.S. Cl.
  CPC .......... *H04L 47/286* (2013.01); *H04L 49/206* (2013.01); *H04M 3/5183* (2013.01)

(58) Field of Classification Search
  CPC ............. H04L 12/1836; H04L 12/1813; H04L 12/1822; H04L 12/1831; H04L 65/403; H04L 65/80; H04L 9/40; H04L 47/10; H04L 65/1101; H04L 69/18; H04L 69/22; H04L 65/1069; H04L 65/70; H04L 65/61; H04L 69/32; H04L 65/752; H04L 25/03885; H04L 65/612; H04L 65/762; H04L 65/756; H04L 43/0829; H04L 43/0852; H04L 47/805; H04L 67/02; H04L 63/08; H04L 41/22; H04L 67/34; H04L 67/568; H04L 41/0856; H04L 41/5067; H04L 69/08; H04L 41/0803; H04L 63/102; H04L 63/20; H04L 67/10015; H04L 67/104; H04L 67/1097; H04L 67/62; H04L 69/328; H04L 51/04; H04L 63/0853; H04L 65/401; H04L 67/565; H04L 41/0813; H04L 41/5009; H04L 43/08; H04L 12/1818; H04L 43/0876; H04L 51/02; H04L 65/1043; H04L 67/01; H04L 9/50; H04L 9/3239; H04L 67/12; H04L 2209/56; H04L 67/306; H04L 67/125; H04L 51/046; H04L 67/535; H04L 67/52; H04L 67/566; H04L 43/16; H04L 67/14; H04L 51/18; H04L 41/0631; H04L 41/12; H04L 41/16; H04L 63/1425; H04L 67/04; H04L 67/30; H04L 67/53; H04L 67/5651; H04L 67/61; H04L 69/16; H04L 69/40; H04L 63/0861; H04L 63/101; H04L 45/742; G06F 1/1635; G06F 1/1684; G06F 1/206; G06F 1/26; G06F 1/324; G06F 1/3278; G06F 11/008; G06F 11/0736; G06F 11/0769; G06F 11/0772; G06F 11/079; G06F 11/3013; G06F 11/3089; G06F 11/3452; G06F 16/164; G06F 16/185; G06F 16/2365; G06F 16/245; G06F 16/24522; G06F 16/24573; G06F 16/9024; G06F 16/9035; G06F 16/9536; G06F 16/9537; G06F 18/217; G06F 18/2185; G06F 18/2413; G06F 18/24133; G06F 18/28; G06F 21/35

See application file for complete search history.

(56) References Cited

U.S. PATENT DOCUMENTS

| | | | |
|---|---|---|---|
| 7,698,398 B1 | 4/2010 | Lai | |
| 7,739,082 B2 | 6/2010 | Scherrer | |
| 9,319,522 B1* | 4/2016 | Webster | .................. H04W 4/14 |
| 9,424,429 B1 | 8/2016 | Roth et al. | |
| 10,410,170 B1 | 9/2019 | McNamara et al. | |
| 10,628,424 B2 | 4/2020 | Park et al. | |
| 10,791,134 B2 | 9/2020 | Gervais et al. | |
| 2002/0091899 A1 | 7/2002 | Weedon | |
| 2004/0128346 A1 | 7/2004 | Melamed et al. | |
| 2009/0276771 A1 | 11/2009 | Nickolov et al. | |
| 2011/0093306 A1 | 4/2011 | Nielsen et al. | |
| 2012/0271852 A1 | 10/2012 | Fredricksen et al. | |
| 2012/0324568 A1 | 12/2012 | Wyatt et al. | |
| 2013/0132854 A1 | 5/2013 | Raleigh et al. | |
| 2013/0156165 A1* | 6/2013 | Springer | ................ H04M 3/493 |
| | | | 379/88.01 |
| 2013/0268656 A1* | 10/2013 | Bott | ........................ H04W 4/16 |
| | | | 709/224 |
| 2014/0095804 A1 | 4/2014 | Lientz | |
| 2015/0319261 A1 | 11/2015 | Lonas et al. | |
| 2017/0178182 A1* | 6/2017 | Kuskey | .................. H04L 51/08 |
| 2017/0344481 A1* | 11/2017 | Pack, III | ............. G06F 12/0833 |
| 2018/0075099 A1 | 3/2018 | Park et al. | |
| 2019/0007507 A1 | 1/2019 | Lonkar et al. | |
| 2019/0102436 A1 | 4/2019 | Bishnoi et al. | |
| 2019/0102791 A1 | 4/2019 | Park et al. | |
| 2019/0394258 A1 | 12/2019 | Park et al. | |
| 2020/0285646 A1 | 9/2020 | Tudoran et al. | |
| 2021/0266353 A1 | 8/2021 | Grubb et al. | |
| 2022/0028160 A1 | 1/2022 | Patel | |

* cited by examiner

401

Initial Stored Value = XYZ
Application Cache Value = null

| | Data Store Value | Application Cache Value | Value to Client - no Stream Cache |
|---|---|---|---|
| Initial Value | XYZ | null | |
| Event/Event Result | QR | null | |
| Client Device Value? | QR | QR | QR |

402

| | Data Store Value | Application Cache Value | Value to Client - with Stream Cache |
|---|---|---|---|
| Initial Value | XYZ | null | |
| Event/Event Result | QR | QR | |
| Client Device Value? | QR | QR | QR |

403

Initial Stored Value = LMN
Application Cache Value = LMN

| | Data Store Value | Application Cache Value | Value to Client - no Stream Cache |
|---|---|---|---|
| Initial Value | LMN | LMN | |
| Event/Event Result | XY | LMN | |
| Client Device Value? | XY | LMN | LMN |

404

| | Data Store Value | Application Cache Value | Value to Client - with Stream Cache |
|---|---|---|---|
| Initial Value | LMN | LMN | |
| Event/Event Result | XY | XY | |
| Client Device Value? | XY | XY | XY |

FIG. 4

AUTHENTICATION CONTROL BASED ON PREVIOUS ACTIONS

STATEMENT OF RELATED APPLICATIONS

This application is a continuation of U.S. patent application Ser. No. 17/538,327, entitled "Prepopulation of Call Center Cache", filed on Nov. 30, 2021, which is a continuation of U.S. patent application Ser. No. 17/533,618, entitled "Stream Listening Cache Updater", filed on Nov. 23, 2021. U.S. patent application Ser. No. 17/538,327, entitled "Prepopulation of Call Center Cache", is also a continuation of U.S. patent application Ser. No. 17/533,773, entitled "Prepopulation of Caches", filed on Nov. 23, 2021. The contents of these disclosures are expressly incorporated herein by reference in their entireties for all purposes.

FIELD OF USE

Aspects of the disclosure relate generally to exchanging information between networked devices.

BACKGROUND

Service providers store data for later retrieval by consumers. Often the data is received via one or more data streams describing events related to consumers (e.g., medical records from visits, network authentication attempts, and/or transactions with merchants). To balance consumers' requests for their data, service providers segment how consumers' data is stored to lessen the processing burden on any one storage system and also to reduce the response time to the consumer because in-memory cache is much faster to access than retrieving the data from the data store (also referred to as persistent storage). For example, in addition to sending data, from a single data store, to consumers based on their requests for their data, some service providers separately cache the data in a separate cache. In the event the consumers request their data a short time later, data stored in the cache may be sent first and, if the desired data is not in the cache, the data may be obtained from other data stores of the service provider. To minimize stale data from residing in the cache, service providers assign limited time-to-live (TTL) values to the data stored in cache. Often, TTLs are stored as either a counter or a timestamp. At the expiration of the TTL, e.g., the event count or timespan reached, the data is discarded. With longer TTLs, there is a greater chance that data is stale. Serving stale data to consumers creates consumer dissatisfaction with the service providers' ability to provide timely data to the consumers. With shorter TTLs, the service providers' other storage systems bear more of the burden providing data to consumers. Due to the spiky nature of consumer demand for data, the service providers using shorter TTLs need to expand the capabilities of their other storage systems to be ready for the spikes in consumer demand for data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve how data may be provided to consumers. In additional aspects, based on the improvements in the ability to provide timely data to consumers, service providers may be able to reduce overengineering their storage systems while maintaining the ability to timely deliver information to consumers, thus providing better consumer experiences using their services. The improved services may be at least based on modifying how received data is stored in an application cache. In one or more aspects, the cache may be refreshed based on data from the service provider's data store and also refreshed based on data from one or more data streams. Other aspects may comprise caching information from the data streams in the application cache for all application users and/or may limit the caching of information to only those application users with information currently in the application cache. Further aspects may comprise improving how applications, provided by a service provider for accessing the consumers' data, interact with the cache and the service provider's data stores. By efficiently storing current data in a cache, timely data may be provided to consumers with decreasing a processing burden on the service provider's data stores and, thus, improve overall experiences for the service provider's consumers.

According to some aspects, a computer-implemented method may comprise receiving, by a server and from an application, a request for first information associated with a user and storing the first information in an application cache, wherein the application cache assigns a time-to-live value to the first information. The method may further comprise monitoring a data stream of incoming information, detecting second information in the data stream associated with the user, wherein the second information comprises a change to the first information. The method may further comprise storing, based on the detecting the second information, the second information in the application cache, wherein the second information overwrites the first information and refreshes the time-to-live value, receiving, from the application, a request for the second information associated with the user, and sending, to the application, the second information.

According to other aspects, these and other benefits may be achieved by using a computer-implemented method that may comprise receiving, at a data store, a data stream comprising information in fields; receiving, at a server, the data stream; determining, at the server and from the fields in the data stream, one or more time-to-live (TTL) values associated with the fields; and storing, in an application cache, the information and the one or more TTL values associated with the information, wherein the one or more TTL values are based on one or more fields of the information. The computer-implemented method may also comprise deleting, based on an expiration of a first TTL value associated with first information, the first information from the application cache; receiving, from an application, a request for the first information of a first field, related to a user, and second information of a second field, related to the user; determining, at the application cache, that the second information of the second field, of the user, is currently stored in the application cache; and sending, based on a determination that the second information in the second field of the user is currently stored in the application cache, the second information to the application.

In one or more examples, the method may comprise receiving, from an application, user interaction information; predicting, using a machine-learning model trained on previous interactions of previous users with their applications and with call centers and based on the received user interaction information, information expected to be needed by a call center when responding to an inquiry from the user; and populating a call center cache based on a prediction for the user. The method may also comprise storing, in an application cache and with a time-to-live value, first information for the application; monitoring a data stream of incoming information; detecting second information in the data stream; and storing, based on the detecting the second information, the second information in the application cache, wherein the second information overwrites the first information and refreshes the time-to-live value. In one or more examples, the method may further comprise receiving interactions between the call center and the user; and retraining, based on the interactions between the call center and the user and based on the previous interactions of the previous users with their applications and with the call centers, the machine-learning model.

In one or more examples, the method may comprise receiving, from an application, user interaction information; predicting, using a machine-learning model trained on previous interactions of previous users with their applications and with call centers and based on the received user interaction information, a likelihood of a user of the application to contact a call center with an inquiry from the user; and populating a call center cache based on a prediction for the user to contact a call center. The method may further comprise authenticating the user based on the prediction for the user; storing, in an application cache and with a time-to-live value, first information for the application; monitoring a data stream of incoming information; detecting second information in the data stream; and storing, based on the detecting the second information, the second information in the application cache, wherein the second information overwrites the first information and refreshes the time-to-live value. In one or more examples, the method may further comprise receiving interactions between the call center and the user; and retraining, based on the interactions between the call center and the user and based on the previous interactions of the previous users with their applications and with the call centers, the machine-learning model.

A computer-implemented process may include receiving, by a server and from an application, first information from an application cache associated with the application. The process may include prepopulating a first action cache with at least some of the first information received from the application cache, receiving a first request, by the server and from the application, a first request comprising a request for performing a first action, and performing the first action. The process may include prepopulating, with second information and based on the performance of the first action, a second action cache with at least some of the first information from the first action cache, receiving a second request, by the server and from the application, a second request comprising a request for performing a second action, determining, by the server and based on the second information in the prepopulated second cache, whether to perform the second action, and based on a determination to perform the second action, performing the second action.

In additional examples, the method may additionally include storing the first information in the first action cache, wherein the first action assigns a time-to-live value to the first information and deleting, at an expiration of the time-to-live value of the first information, the first information from the first action cache. The method may include determining, based on receiving the first request from the application, whether to perform the first action, wherein performing the first action is based on a determination to perform the first action. The method may include receiving, by the server and from the application, a third request comprising a request for performing the first action, determining, by the server and based on the first information in the prepopulated first action cache, whether to perform the third request's first action, and based on a determination to not perform the third request's first action, denying the third request.

The first action may include opening a new account, and the first action cache may include a cache of information from which a determination of whether the first request for the first action is fraudulent. The second action may include performing a new transaction, and the second action cache may include a cache of information from which a determination of whether the second request for the second action is fraudulent.

The method may further include monitoring a data stream of incoming information, detecting user-specific information in the data stream associated with a user associated with the application, wherein the user-specific information may include a change to application information in an application cache associated with the application, storing, based on the detecting the user-specific information, the user-specific information in the application cache, wherein the user-specific information overwrites existing user-specific information and refreshes a time-to-live value associated with the user-specific information in the application cache, receiving, from the application, a request for the user-specific information associated with the user, and sending, to the application, the user-specific information.

The method may further include detecting second user-specific information in the data stream associated with the user, wherein the second user-specific information may include information not currently stored in the application cache, and storing, based on the detecting the second user-specific information, the second user-specific information in the application cache, wherein the second user-specific information receives a second time-to-live value, wherein the receiving the request for the user-specific information may include receiving a request for the user-specific information and the second user-specific information, and wherein sending the user-specific information may include sending, to the application, the user-specific information and the second user-specific information.

The method may include receiving, from the application, a request for third user-specific information associated with the user, determining the application cache does not currently store the third user-specific information, receiving, from the server, the third user-specific information and a third time-to-live value, storing, in the application cache, the third user-specific information and the third time-to-live value, and sending, to the application, the third user-specific information.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 shows various examples of how data changes based on whether a stream listening cache service is used;

DETAILED DESCRIPTION

Figure 1:
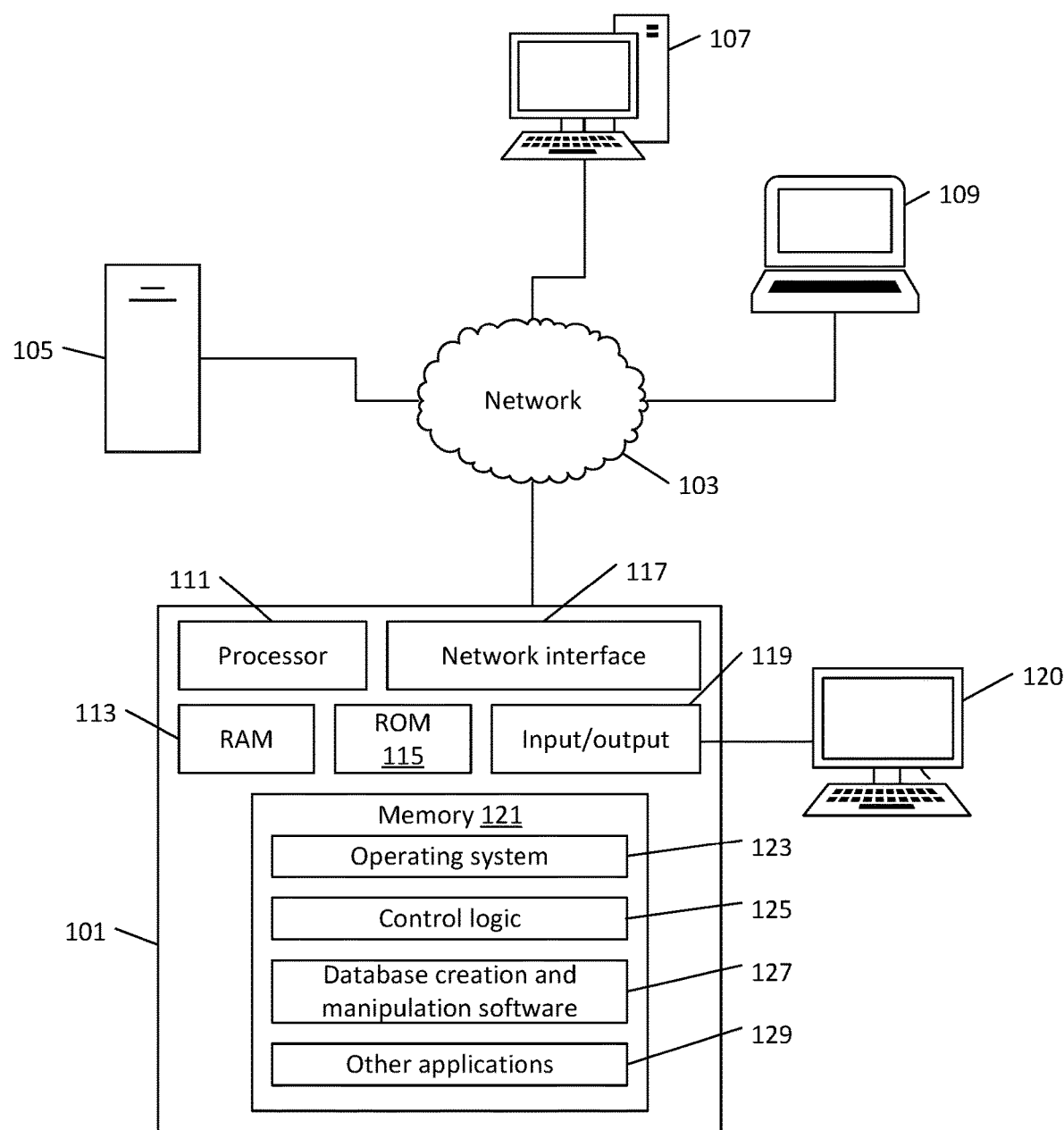
FIG. 1 depicts an example of a computing device and system architecture that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit", " . . . module" described in the specification mean a unit for performing at least one function or operation, which may be implemented as hardware or software, or as a combination of hardware and software. Throughout the specification, expression "at least one of a, b, and c" may include 'a only', 'b only', 'c only', 'a and b', 'a and c', 'b and c', and/or 'all of a, b, and c'.

By way of introduction, aspects discussed herein may relate to methods and techniques for storing incoming data from one or more data streams in an application cache while also storing the data in one or more data stores. One or more aspects may generally relate to improving how constantly changing data is provided to a user. Content of a data store changes over time. In some examples, one or more stream listening services may subscribe to the stream of changes from the data store. In other examples, stream data may also flow from a source to the data store, where the stream being received by the data store may also be received by the stream listening service. In general, the stream data includes different types of information (transaction IDs, card numbers, account numbers, user names, merchant names, etc.). Additionally or alternatively, the information stored in the application cache may be used to prepopulate other caches. Additionally or alternatively, a user's interactions with their account may be used to prepopulate a cache related to monitoring different account interactions.

When a user accesses an application to obtain information regarding the user's information (e.g., event history including medical history, financial transactions, shopping history, and/or any status and/or history relating to the user), the application queries an application cache for the user's information. If the information is in the application cache, the application provides the information to the user. If the information is not in the application cache, the application queries a data store for the information. At least some of the information received from the data store is provided to the user and at least some of the information is stored in the application cache. TTL values may be assigned to the information stored in the application cache. Upon expiration of the TTL values, the associated information stored in the application cache may be deleted. For future requests from the user's application for information, the application again queries the application cache. If the information still resides in the application cache, the information may be provided to the user. If the information is not in the application cache (e.g., never previously in the application cache or previously in the application cache but deleted as its associated TTL had expired and the information deleted), the application queries the data store for the information.

One or more aspects described herein include updating the information stored in the application cache from the incoming data stream and/or data streams as opposed to solely updating the application cache from the data store. For instance, the application cache may be subscribed to a service configured to listen to data streams for information relevant to the individual users. When the listening service receives information relevant to a user, the service may determine a TTL value or values for the information and forward the information and the TTL value or values to the application cache.

In one example, a user may check the user's account balance using the application. The application may determine that the current account balance is not currently stored in the application cache and request the current account balance from the data store. The application cache may receive a current account balance from the data store and provide the current account balance to the user. The stream listening service may detect a transaction related to the user (e.g., via matching a user identification, account identification, or the like). The stream listening service may forward information relating to the transaction to the application cache, e.g., a transaction amount. The application cache may determine an updated account balance by subtracting the transaction amount from the account balance stored in the application cache. The application cache may update the stored account balance with the newly calculated account balance. Also, the TTL value may be refreshed to extend its lifetime.

Additionally or alternatively, the user's interactions with the application cache may be used by a first machine learning model to predict one or more issues for handling by a call center and prepopulate a cache of the call center with the user's information. Additionally or alternatively, the user's interactions with the application cache may be used by a second machine learning model to predict if, and when, the user is likely to contact a call center and, based on that prediction, modify an authentication procedure used by the call center to authenticate the user. Additionally or alternatively, the user's interactions with the user's account may be used by a third machine learning model to predict possible future user actions and prepopulate another cache based on those predictions.

Some of the advantages described herein include improving the timeliness of information stored in the application cache. Other advantages include reducing the quantity of queries sent to the data store to obtain users' information. Further advantages may include prepopulating other caches based on a users' interactions with the application and/or their account.

As described herein, the application may also be augmented using artificial intelligence. The artificial intelligence may comprise one or more machine learning models. The one or more machine learning models may comprise a neural network, such as a convolutional neural network (CNN), a recurrent neural network, a recursive neural network, a long short-term memory (LSTM), a gated recurrent unit (GRU), an unsupervised pre-trained network, a space invariant artificial neural network, a generative adversarial network (GAN), or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique. Additionally or alternatively, the machine learning model may comprise one or more decisions trees, a support vector machine, logistic regression, random forest, or equivalents thereof.

In one or more aspects, the artificial intelligence may be trained to review and/or analyze (e.g., scrape) the records stored in one or more existing caches of one or more users and, to the extent relevant, if, and when, those users contacted call centers. The artificial intelligence may be used to identify the parties and/or processes, authenticate relationships across accounts, digitally verify data from shared sources, validate compliance with laws and regulations, and/or identify potential fraud. The one or more machine learning models may be trained using supervised learning, unsupervised learning, back propagation, transfer learning, stochastic gradient descent, learning rate decay, dropout, max pooling, batch normalization, long short-term memory, skip-gram, or any equivalent deep learning technique. Once the one or more machine learning models are trained, the one or more machine learning models may be exported and/or deployed to prepopulate one or more caches, predict when events are likely to occur, and/or assist in the authentication of account-related events. For instance, the predictions from a machine-learning model may be used to analyze and/or review records associated with account-related events to reduce the risk associated with that account and/or other accounts.

In some embodiments, the machine learning models may be existing machine learning models. In further embodiments, the machine learning models may be proprietary models. Alternatively, the machine learning models may be modified existing machine learning models such that the machine learning models become proprietary. In some instances, the machine learning models may be trained using different parameters, such as back propagation, transfer learning, stochastic gradient descent, learning rate decay, dropout, max pooling, batch normalization, long short-term memory, skip-gram, and/or any equivalent deep learning technique. Using this information, the machine-learning models may be trained or even further trained to refine the machine learning models.

Before discussing these concepts in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or JavaScript. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for listening to data streams.

Figure 2:
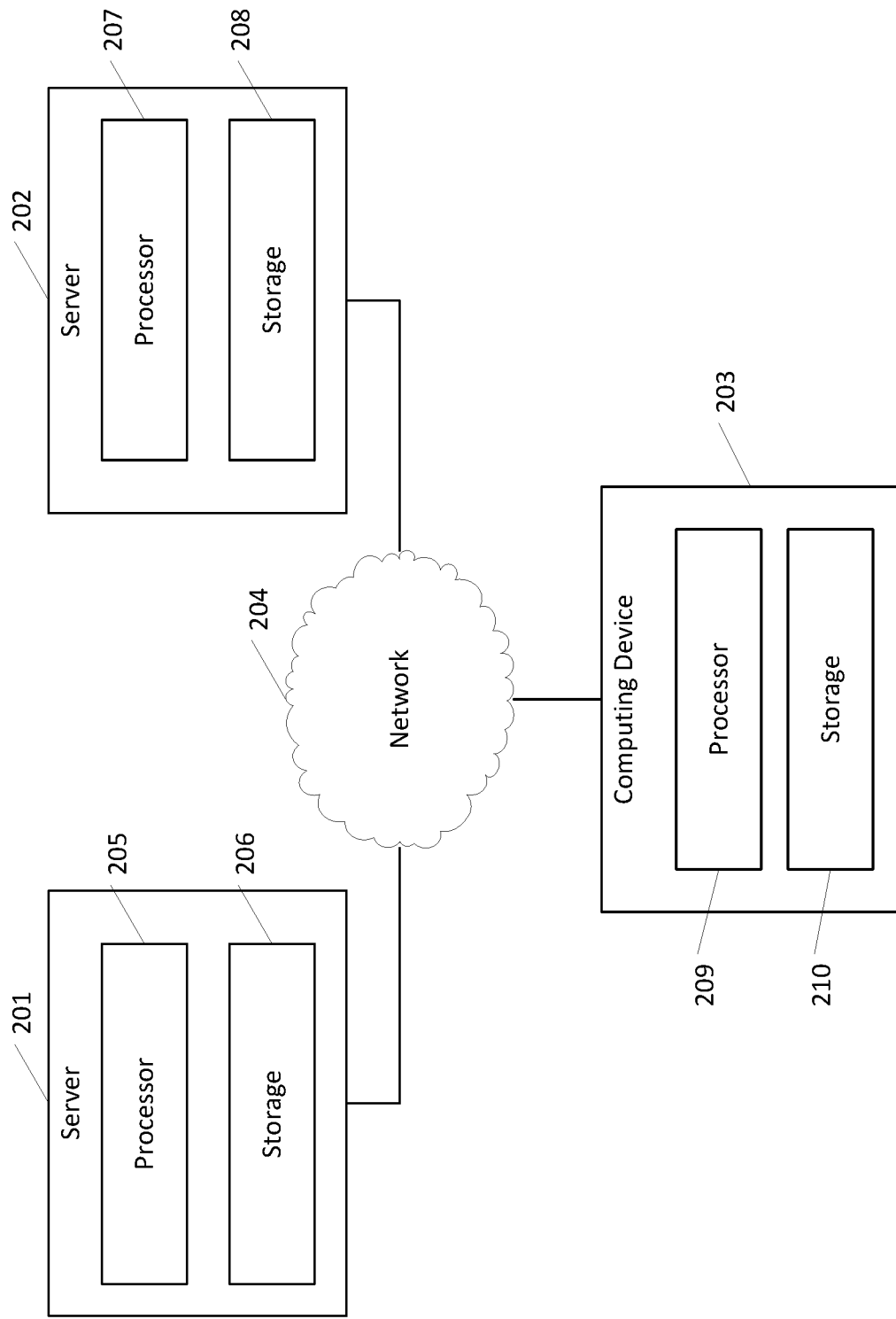
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the environment 203 may perform one or more functions described as being performed by another set of devices of the environment. Network 204 may be represented as a single network but may comprise combinations of other networks or subnetworks. In one or more examples, a data stream (not shown) may be received by server 201, where server 201 is a data store for received information. The data stream may also be received by server 202. Server 202 may also store a cache for a user application (e.g., referred to herein as an "application cache"). The server 202 may parse the incoming data stream and, where relevant for users using applications that rely on the server 202's application cache, the server 202 may extract information from the data stream, determine one or more TTL values to be stored with the information, and store the extracted information and the TTL values for access by the users' application. The application may request information first from the application cache in server 202. If the desired and/or current information is not in the application cache, a query for the information may be sent to server 201, the data store for information received for the incoming data stream. The information from server 201 may be both sent to the computing device 203 and stored in the application cache in 202. TTLs may be generated by either the server 201, the sever 202, or a combination of each of servers 201 and 202.

A process of listening to a data stream and updating an application cache is described herein. For purposes of explanation, the process is described in the following sections: Updating Application Cache from a Data Stream; Processes for Updating Application Caches from Data Streams; Processes for Prepopulating a Call Center Cache; and Processes for Prepopulating a Cache based on Previous Account Interactions.

Updating Application Cache from a Data Stream

Figure 3:
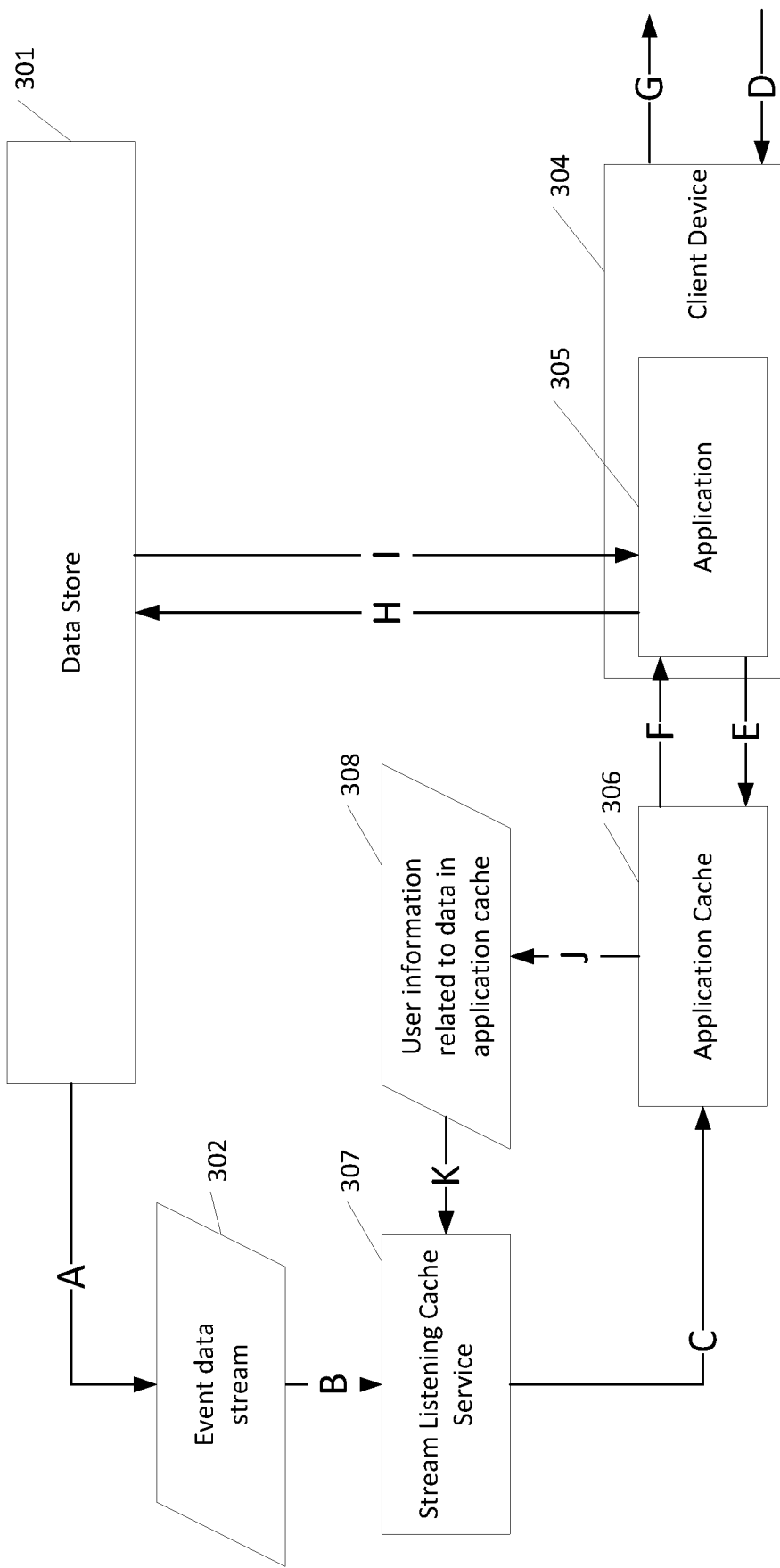
FIG. 3 depicts a block diagram showing various process flows for updating an application cache.

FIG. 3 depicts a block diagram showing various process flows for updating an application cache. FIG. 3 comprises a data store 301 configured to store users' information. As users interact with other entities, those interactions are received and stored in the data store 301. An event data stream 302 may be subscribed to by a stream listening cache service 307. The event data stream 302 may comprise events, such as, visiting a doctor and a user's medical record being updated, visiting a financial institution and securing a loan, making a purchase at a merchant, or the like. The type and quantity of events is not limited. The event data stream 302 is shown generally as path A and path B. The event data stream 302 may comprise single events pertaining to a single user and/or multiple events of multiple users and/or any combination thereof. For instance, the event data stream 302 may comprise information in one or more fields where the information identifies an account identification, a transaction type, a transaction amount or change amount, and/or other information that describes the one or more events.

FIG. 3 also shows a client device 304 (e.g., device 101) receiving user's input (e.g., via path D). The client device 304 may include an application 305 executing in one or more processors of the client device 304. For instance, the user may request the application 305 to obtain the user's current account balance based on a quantity of recent transactions (e.g., events) made by the user. The application 305 first attempts to obtain information (e.g., via path E) from an application cache 306. The application cache 306 may reside inside one or more servers and/or someplace else (e.g., in a cloud-accessible storage). Information available in the application cache 306 is sent to the application via path F. For information not available in the application cache 306, the application 305 requests (via path H) the missing information from the data store 301. Additionally or alternatively, the application cache 306 may request the missing information from the data store 301. Information from the data store 301 may be sent to the application 305 via path I and the information (from either the application cache 306, the data store 301, or a combination of the application cache 306 and the data store 301).

As described herein, one or more aspects relate to separately listening to the event data stream 302 and providing parsed stream data to the application cache 306. As shown in FIG. 3, a stream listening cache service 307 (e.g., provided by a separate server—for instance, server 202 of FIG. 2—or a server used for another purpose as described herein) listens to the event data stream 302 and provides new data, via path C, to the application cache 306. The stream listening cache service 307 may process all streamed data or may process only a subset of the streamed data. In an example where only a subset of the streamed data from the event stream 302 is processed, the stream listening cache service 307 may receive (e.g., via path K) user information 308 from the application cache 306 regarding information currently stored in the application cache 306. The dataset describing the user information 308 may be a complete copy of the data in the current application cache, may be a dataset that identifies, for each user, which fields of information and/or types of information are currently stored in the application cache (e.g., account balance, most recent transaction, loan information, account information, etc.), and/or may be a dataset that identifies the users that have current data in the application cache 306. Using the user information 308 (e.g., identifying the actual values of data in the cache for specific users, identifying the fields of data in the cache for the specific users, and/or identifying the specific users that have at least some data in the application cache), the stream listening cache service 307 may listen specifically for data in the event data stream 302 that relates to the user information 308. If the stream listening cache service 307 determines that event stream data 302 relates to the user information 308, the stream listening cache service 307 may extract the information from the event data stream 302, determine one or more TTL values for the extracted information, and send (via path C) the extracted information and the one or more TTL values for storage in the application cache 306. Based on the extracted information, the application cache 306 may replace existing values with new values from the extracted information from the stream listening cache service 307, may additionally store the new values from the extracted information from the stream listening cache service 307 while retaining existing values in the application cache 306 for the user, and/or may calculate replacement values based on adjusting existing values using the new values from the extracted information from the stream listening cache service 307. For example, to calculate a replacement value for an existing account balance (the existing account balance stored in the application cache 306), the application cache 306 may receive (as a new value from the extracted information from the stream listening cache service 307) a transaction amount. The application cache 306 may subtract the transaction amount from the existing account balance, resulting in a new account balance. In this example, the actual account balance was not received as part of the information from the data stream but was calculated based on the transaction amount from the data stream and the existing account balance stored in the application cache 306. Additionally or alternatively, the calculation of the replacement values may occur in the stream listening cache service 307 (e.g., where the actual values from the application cache 306 are received with the user information 308 and the stream listening cache service 307 subtracts the detected transaction amount from the event data stream 302 from the received account balance from the application cache 306).

Additionally or alternatively, the stream listening cache service 307 may not receive user information 308 and rather process all information for all users and provide that information to the application cache 306. Additionally or alternatively, the stream listening cache service 307 may have a separate list of users of the application 305 and, based on event stream data 302 relating to users on that separate list of users, may extract the relevant information from the event data stream 302 and forward it to the application cache 306.

The information received by the application cache 306 from the stream listening service 307 may be assigned a single TTL value (e.g., assigning the same TTL value for each of the user's name, account number, transaction identification, merchant, transaction amount, account balance, etc.) such that, at the expiration of the TTL value, all information in the application cache associated with that TTL value is deleted. In a further example, the information received may be assigned different TTL values (e.g., assigning different TTL values for each of the user's name, account number, transaction amount, and/or account balance, etc.). Because the user's name and/or account number changes slowly (if at all), that information may be assigned a longer TTL (e.g., 5 minutes, 5 days, 5 months, etc.) as desired. Because other information (e.g., the transaction amount and/or account balance) changes more often, that information becomes stale more quickly and that information may be assigned a shorter TTL (e.g., 30 seconds, 1 minute, 10 minutes).

In one or more examples, the TTLs may be assigned fixed TTLs based on the type of information. For example, the information may be delimited as content in separate fields and the TTLs assigned to the content based on the fields. For instance, first content in an "account number" field may be assigned a first TTL and second content an "account balance" field may be assigned a second TTL, where the first TTL is different from the second TTL. Additionally or alternatively, the TTLs may be assigned to the information based on the origin of the information. For instance, information received from a first data stream may be assigned one TTL and information received from a second data stream may be assigned another TTL, where the two TTLs are different. In yet another example, information received from the data store may be assigned one TTL and information received from a data stream may be assigned another TTL, where the data store-assigned TTL and the data stream listener service-assigned TTL are different.

The stream listening cache service 307 may determine one or more TTL values for the records. One TTL value may be assigned for each parsed record. Additionally or alternatively, one or more fields of a parsed record may receive a first TTL value and other fields of the parsed record may receive other TTL values that are different in length or duration from the first TTL value. Additionally or alternatively, the application cache 306 may determine and/or update TTL values for information stored in the application cache 306. For instance, where a replacement account balance is determined in the application cache 306, the application cache 306 may generate a new TTL value for the replacement account balance and/or update an existing TTL value to extend its life.

FIG. 4 provides four examples of how data is provided to application 305 based on whether application cache 306 includes a value associated with a user and whether the stream listening cache service 307 exists. In the examples of FIG. 4, an event 302 occurs that changes modifies data associated with a user from a first value to a second value. For example, a user purchases a product from a merchant and the user's account balance changes based on the transaction. For reference, in examples 401-404, the rows corresponding to the events are identified as "Event/Event Result" as the data that may be available in the event data stream 302 of FIG. 3 may be an actual value (e.g., a transaction ID number, merchant name, a transaction amount, etc.) from the event, may be a value that, when combined with other information, is a resulting value (e.g., a remaining balance—calculated from subtracting a transaction amount from a customer's existing balance, a remaining amount left on a mortgage and/or lien, etc.), and/or a combination of actual values and calculated values. Example 401 describes interactions between a data store 301, an application cache 306, and an application 305 in which no stream listening cache service 307 is used and no initial value is present in the application cache 306. Example 402 describes interactions between the data store 301, the application cache 306, and the application 305 in which a stream listening cache service 307 is used and no initial value is present in the application cache 306. Example 403 describes interactions between the data store 301, the application cache 306, and the application 305 in which no stream listening cache service 307 is used and an initial value is present in the application cache 306. Example 404 describes interactions between the data store 301, the application cache 306, and the application 305 in which a stream listening cache service 307 is used and an initial value is present in the application cache 306.

In example 401, an initial value of XYZ (e.g., an initial account balance of the user) is stored in the data store 301. Because the user has not recently requested the value from data store in a while, any cached value in the application cache 306 has already been deleted—e.g., because of the expiration of an associate TTL value. In example 401, the stream listening cache service 307 is not used. An event 302 occurs that affects that initial value XYZ (e.g., the user purchases a product having a cost that, when subtracted from value XYZ, results in value QR). The event data stream includes a change that, when processed by the data store 301, results in a new value QR. A user controls the application 305 on the client device 304 to obtain information regarding the user's account. The application 305 first attempts (via path E) to obtain the information from the application cache 306. Because none of the user's information remains in the application cache 306 (identified to the application 305 via path F), the application 305 requests the information, via path H, from the data store 301 and receives it via path I. The application 305 provides the information to the user via path G. Because the application cache 306 did not have any information of the user, the application 305 obtained the most current information (value QR) from the data store 301 and provided it to the user.

In example 402, the stream listening cache service 307 exists, e.g., stream listening cache service 307, of FIG. 3, configured to receive the event data stream 302, via path B, and provide information and TTL values, via path C, to the application cache 306. In example 402, the initial value of XYZ (e.g., an initial account balance of the user) is stored in the data store 301. Because the user has not recently requested the value from data store in a while, any cached value in the application cache 306 has already been deleted—e.g., because of the expiration of an associate TTL value. An event 302 occurs that affects that initial value XYZ (e.g., the user purchases a product having a cost that, when subtracted from value XYZ, results in value QR). The event data stream includes a change that, when processed by the data store 301, results in a new value QR. Because the stream listening cache service exists in example 402, the stream listening cache service responds to the event 302 by forwarding the event/event result QR, along with one or more TTL values, to the application cache 306. In the example 402, the value stored in application cache is QR. Additionally or alternatively, information may be forwarded to the application cache that prompts the application cache to query the data store 301 for additional information to determine the resulting value QR.

Next, a user controls the application 305 on the client device 304 to obtain information regarding the user's account. The application 305 first attempts (via path E) to obtain the information from the application cache 306. Because the stream listening cache service forwarded information to the application cache 306 that resulted in value QR being stored (directly or via additional interactions with the data store 301), the application cache 306 has the value QR and is able to provide it to the application 305. Compared to example 401, the example 402 with the stream listening cache service provides the benefit of reducing the quantity of queries sent from the application cache 306 to the data store 301 for information.

In example 403, no stream listening cache service exists. An initial value LMN is stored in both the data store 301 and in the application cache 306. For instance, a user may have recently queried the application 305 for information. In response, the application 305 obtained value LMN from the data store 301 and provided it to both the user and the application cache 306 (along with one or more TTL values). A new event is received with the event/event result value XY and is stored in the data store 301. Next, a user controls the application 305 on the client device 304 to obtain information regarding the user's account. The application 305 first attempts (via path E) to obtain the information from the application cache 306. Because the application cache 306 already has value LMN and the TTL value or values have not expired, the application cache 306 provides the value LMN to the application 305. However, the actual event/event value is XY and is only stored in the data store 301. Eventually, once the TTL value or values expire and the user subsequently operates the application, the application queries the data store 301 for the value and provides it to the user. In other words, the user may be initially provided incorrect information but will eventually receive the correct information. While the time delay between receiving the incorrect information and the correct information may be small (e.g. 5 minutes, an hour, etc.), users may become frustrated based on the lack of the application 305 to consistently provide correct data.

Further, based on examples 401 and 403, in situations where the various values in the application cache 305 have TTL values of different lengths, users may be provided with odd combinations of fresh and stale data. For instance, if a user changes a value during a call with customer service and that value is associated with a long TTL value (e.g., a corrected address) and the application cache 306 still has the old (now stale) value in it, any new event containing values not already in the application cache 306 will appear as fresh (and accurate) values (based on example 401) while the information changed during the call will be stale (based on example 403) because of the information existing in the application cache 306 while fresher information exists in the data store 301.

In example 404, the stream listening cache service 307 exists. An initial value LMN is stored in both the data store 301 and in the application cache 306. For instance, a user may have recently queried the application 305 for information. In response, the application 305 obtained value LMN from the data store 301 and provided it to both the user and the application cache 306 (along with one or more TTL values). A new event is received with the event/event result value XY and the value XY is stored in the data store 301. Because the stream listening cache service exists in example 404, the stream listening cache service responds to the event 302 by forwarding the event/event result XY, along with one or more TTL values, to the application cache 306. In the example 404, the value stored in application cache is XY. Additionally or alternatively, information may be forwarded to the application cache that prompts the application cache to query the data store 301 for additional information to determine the resulting value QR. Next, a user controls the application 305 on the client device 304 to obtain information regarding the user's account. The application 305 first attempts (via path E) to obtain the information from the application cache 306. Because the application cache 306 already has value XY and the TTL value or values, associated with the value XY have not expired, the application cache 306 provides the value XY to the application 305.

Processes for Updating Application Caches from Data Streams

Figure 5:
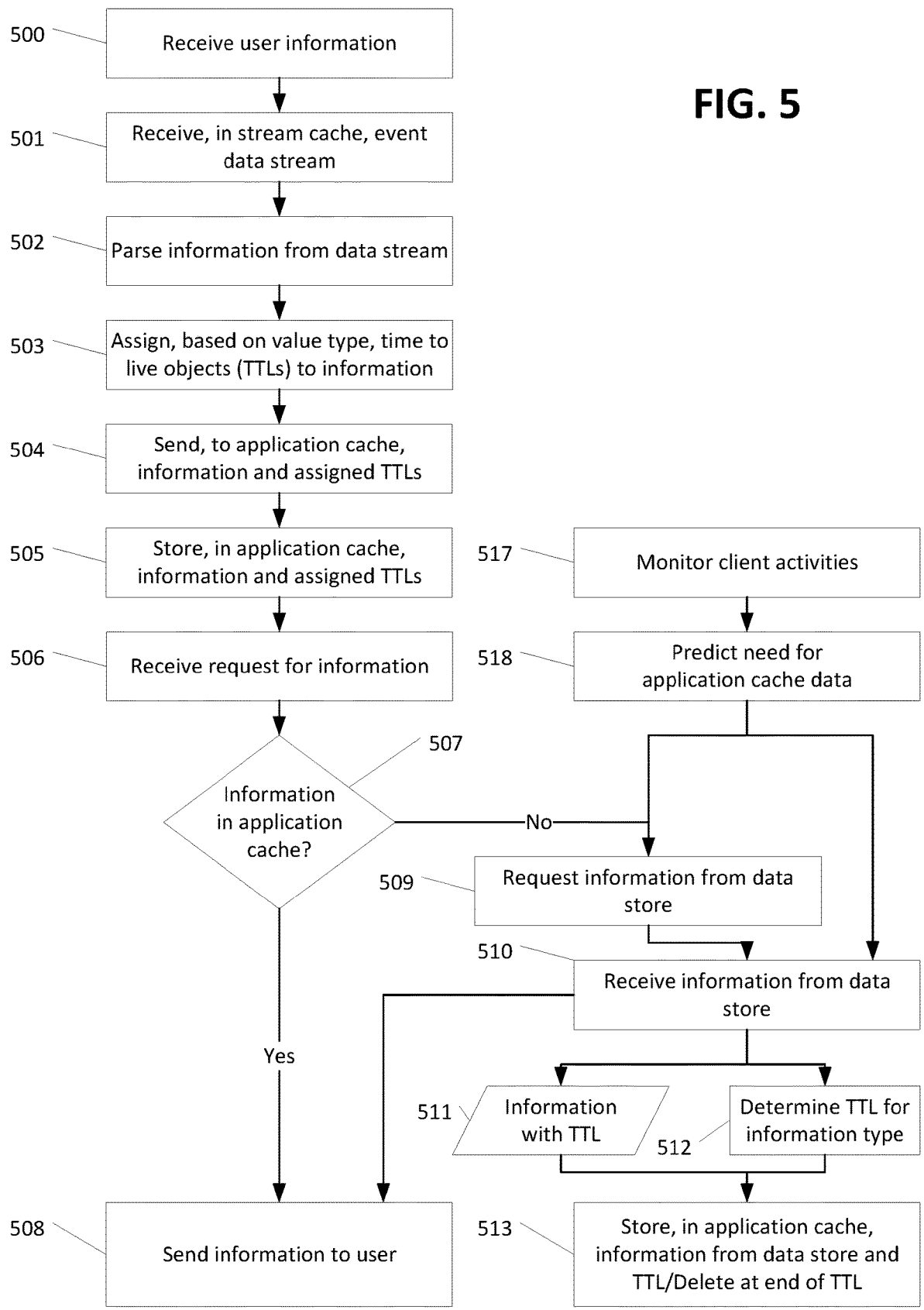
FIGS. 5-7 depict examples of processes for updating application caches using data from data streams.
Figure 6:
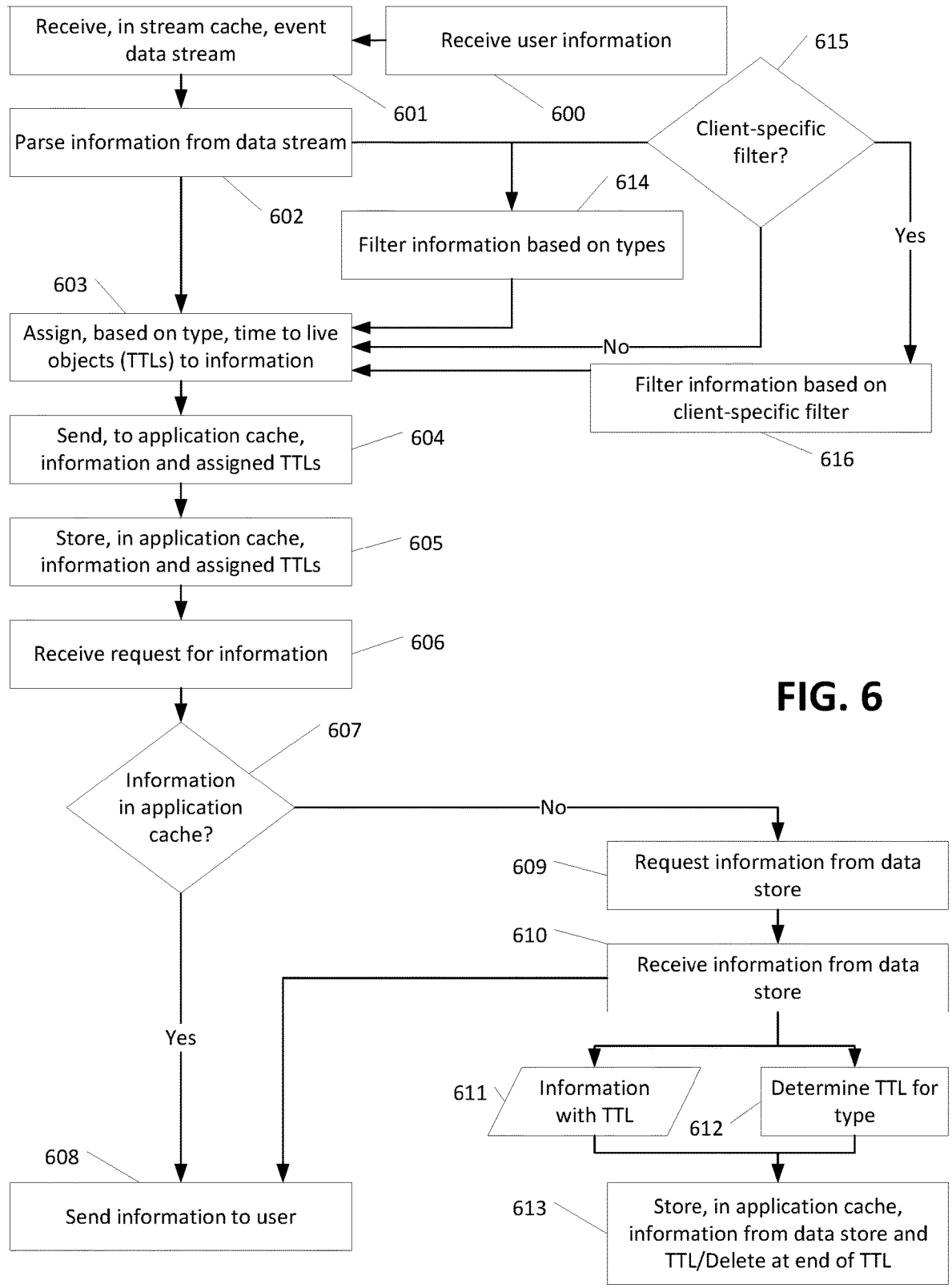
Figure 7:
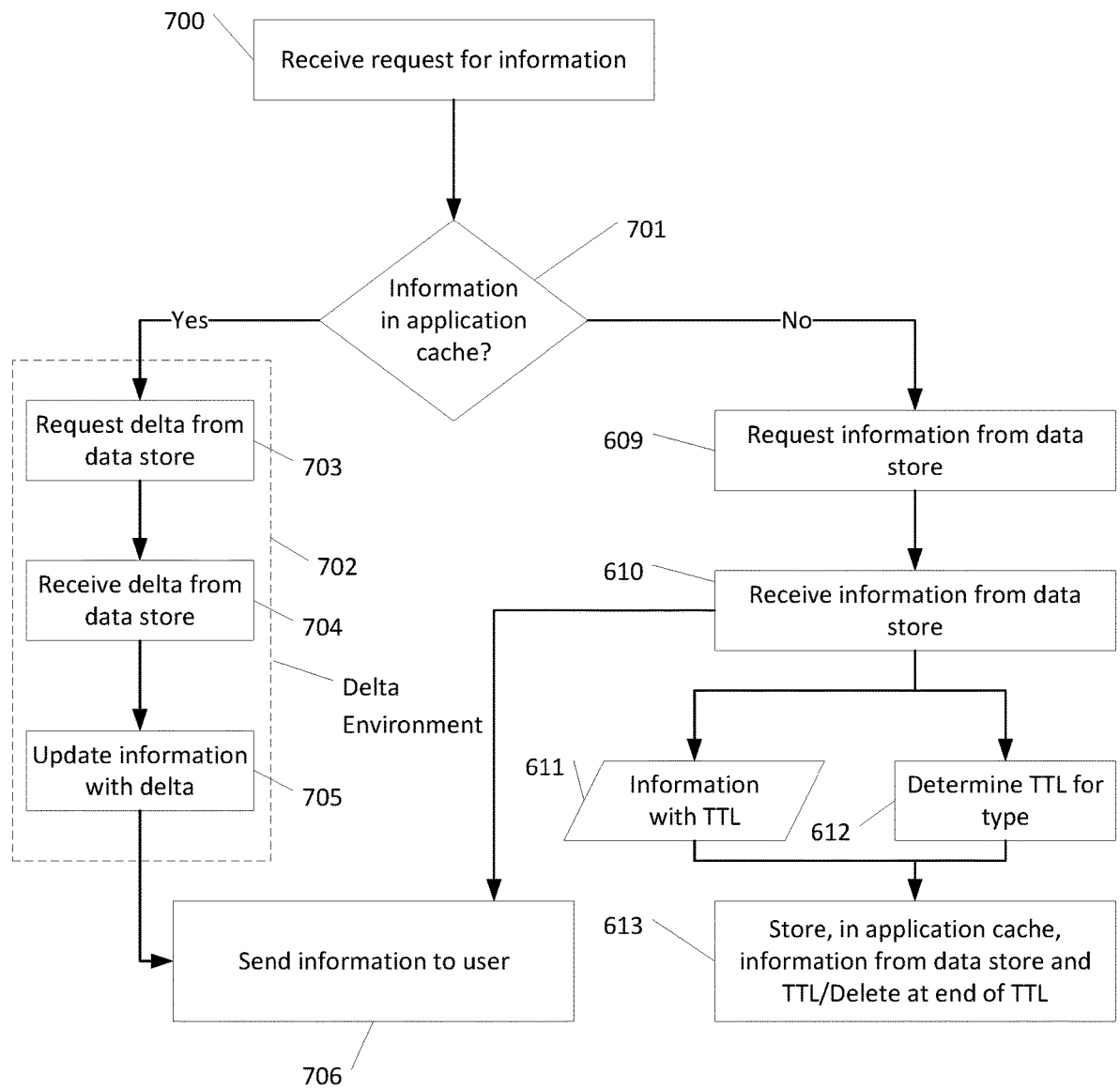

FIGS. 5-7 depict examples of processes for updating application caches using data from data streams. In FIG. 5, a stream listening cache service (concatenated in the figure as "stream cache") receives user information in step 500 and an event data stream in step 501. In some examples, the stream listening cache service may not receive user information 500 but instead have a predefined list of users and/or may process an event stream for all users. It is appreciated that step 500 may be included or not included as desired. In step 502, the stream listening cache service parses information from the data stream. The parsing of step 502 may be based on the combination of the user information of step 500 and the event data stream of step 501 or may be based on the event data stream 501 and possibly including other information. In step 503, the stream listening cache service assigns TTL values based on the types of values in the parsed information. In step 504, the stream listening cache service sends, to an application cache, information and associated TTL values. In step 505, the application cache stores the information and the TTL values. In step 506, an application receives a request for information from a user. In step 507, the application determines whether the information currently exists in the application cache. If the information exists in the application cache, then, in step 508, the information is sent to the user, for instance, via an application controlling a display to display the received information.

If the information does not currently exist in the application cache, the application and/or the application cache requests, in step 509, the information from the data store. In step 510, the information is received from the data store. In some instances, the information may be received with one or more TTL values (as data 511). In other instances, the application and/or the application cache may determine (in step 512) one or more TTLs to store with the received information. In step 513, the information and the one or more TTLs are stored in the application cache. At the expiration of a TTL, the information associated with that TTL is deleted from the application cache. Additionally or alternatively, the application and/or the data store may monitor a user's activities in step 517 and, based on those activities, predict in step 518 that the user may be interested in obtaining information using the application. Based on that determination, the application may request updated information from the data store to prepare for the possible user request for information. Additionally or alternatively, the data store may proactively forward information to the application and/or to the application cache for satisfying the user's request for information.

In FIG. 6, a stream listening cache service receives user information in step 600 and an event data stream in step 601. In some examples, the stream listening cache service may not receive user information 600 but instead have a predefined list of users and/or may process an event stream for all users. It is appreciated that step 600 may be included or not included as desired. In step 602, the stream listening cache service parses information from the data stream, for instance, to extract information relating to one or more specific users. The parsing of step 602 may be based on the combination of the user information of step 600 and the event data stream of step 601 or may be based on the event data stream 601 and possibly including other information. In step 603, the stream listening cache service may assign, based on a type or types of information received, one or more TTL values to the information. In step 604, the stream listening cache service sends, to an application cache, information and the associated TTLs. In step 605, the application cache stores the information and the assigned TTLs. In step 606, an application receives a user request for information. The application determines, in step 607, whether the information exists in the application cache. If the information exists in the application cache, then, in step 608, the information is sent to the user, for instance, via an application controlling a display to display the received information.

If the information does not currently exist in the application cache, the application and/or the application cache requests, in step 609, the information from the data store. In step 610, the information is received from the data store and forwarded to the user in step 608. In some instances, the information may be received with one or more TTL values (as data 611). In other instances, the application and/or the application cache may determine (in step 612) one or more TTLs to store with the received information. In step 613, the information and the one or more TTLs are stored in the application cache. At the expiration of a TTL, the information associated with that TTL is deleted from the application cache. Additionally or alternatively, from step 602, the stream listening cache service may filter the information parsed from the data stream based on types of information and only assign, in step 603, TTLs to information relating to selected types. Additionally or alternatively, from step 602, the stream listening cache service may determine, in step 615, whether a user-specific filter exists for various data types. For instance, a user may desire that identification information relating to the user and merchants be stored in the application cache but not want financial amounts be stored in the application cache. If the stream listening cache service determines, in step 615, that no user-specific filter has been set, then the stream listening cache service assigns, in step 603, TTL values to information relating to the information. If the stream listening cache service determines, in step 615, that a user-specific filter has been set, then the stream listening cache service filters, in step 616, the information by the desired types and then assigns, in step 603, TTL values to the filtered information.

FIG. 7 depicts a process of responding to a user request for information where the information stored in the application cache may or may not be stale. For instance, the TTL value assigned to the information in the application cache may be about to expire (within a few seconds, within a few minutes, and the like). Because the value stored in the application cache may be different from a current value stored in the data store, the application attempts to update the value from the data store. In step 700, an application receives a request for information. The request may be similar to the request received in step 606 in FIG. 6. In step 701, the application determines whether the information exists in the application cache. If the information does not currently exist in the application cache, then the application interacts with the data store as shown in steps 609-613 as described above with respect to FIG. 6. If the information does exist, the application cache may attempt to obtain one or more incremental changes that have occurred since the value was last updated. For instance, changes to values may originate outside of the data stream or data streams. For reference, the application cache may be operating in a delta-type environment 702 in which it attempts to obtain one or more delta changes (changes since a previous point) and apply those changes to the value in the application cache. In step 703, the application and/or application cache requests the delta changes from the data store. In step 704, the delta changes are received from the data store. In step 705, the value in the application cache is updated based on the delta changes from the data store. In step 706, the updated value is provided to the user. The TTL value associated with the updated value may be updated as well and/or the TTL value may be permitted to expire and force the application to obtain fresh data from the data store the next time the user operates the application to obtain the user's data.

Figure 8:
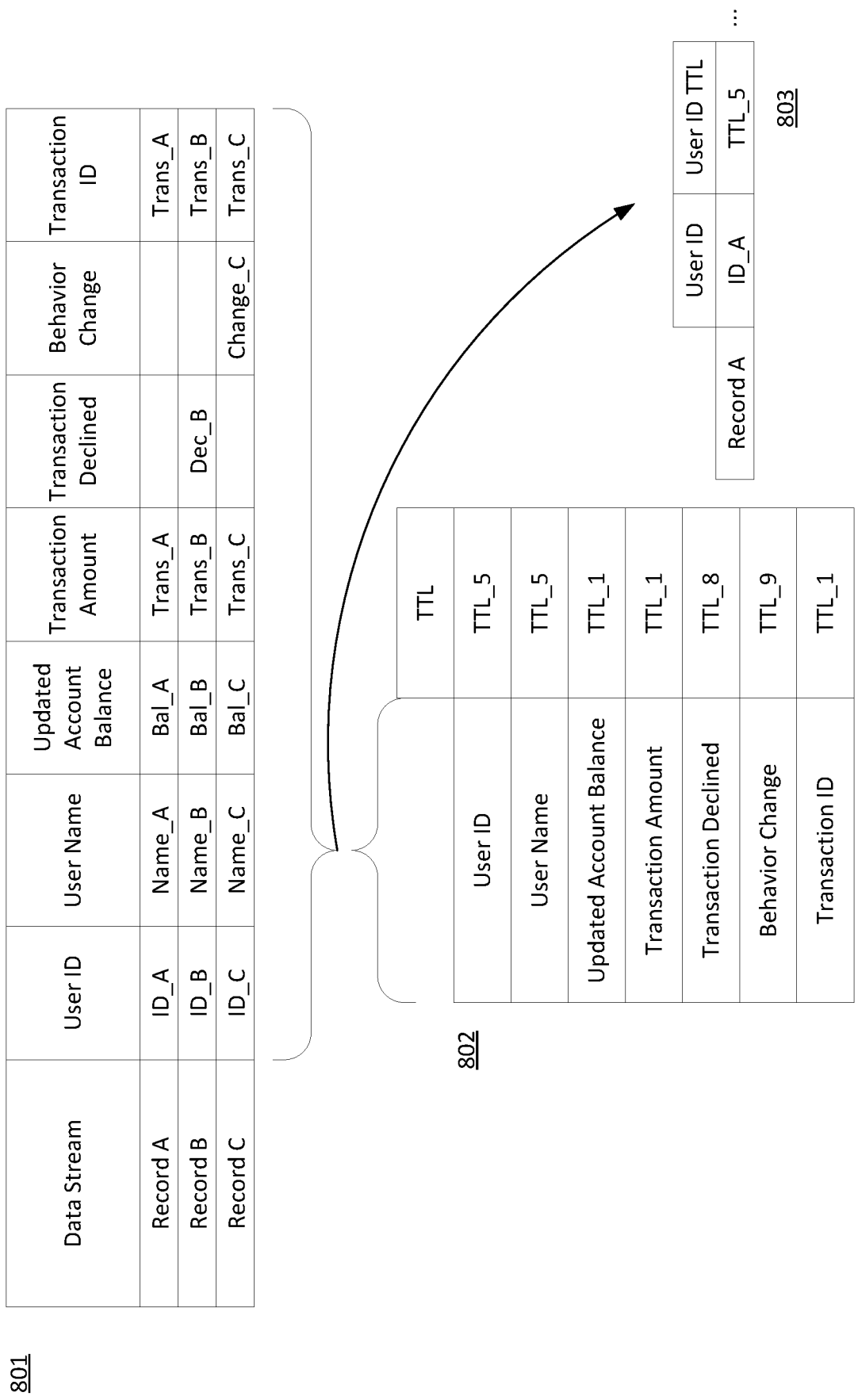
FIG. 8 depicts an example content in a data stream and the assignment of TTLs.

FIG. 8 depicts an example content in a data stream and the assignment of TTLs. The data stream is represented as a streaming table 801 with records {Record A, Record B, and Record C} with data arranged in fields {user identification, user name, updated account balance, transaction amount, transaction declined, behavior change, and transaction identification}. Additional and/or fewer records and/or fields may be used as desired. Table 802 comprises the fields and TTL values for the fields. Some TTL values may be the same as some TTL values and different for other TTL values. The data stream 801 may be parsed, TTL values from table 802 assigned, and combined in table 803 data to be sent to an application cache for a user (e.g., the user related to Record A of the three records of data stream 801).

Based on the above, a computer-implemented method may comprise receiving, by a server and from an application, a request for first information associated with a user and storing the first information in an application cache, wherein the application cache assigns a time-to-live value to the first information. The method may further comprise monitoring a data stream of incoming information, detecting second information in the data stream associated with the user, wherein the second information comprises a change to the first information. The method may further comprise storing, based on the detecting the second information, the second information in the application cache, wherein the second information overwrites the first information and refreshes the time-to-live value, receiving, from the application, a request for the second information associated with the user, and sending, to the application, the second information.

In additional aspects, the computer-implemented method may further comprise detecting third information in the data stream associated with the user, wherein the third information comprises information not currently stored in the application cache, and storing, based on the detecting the third information, the third information in the application cache, wherein the third information receives a second time-to-live value. The request may include a request for the second information and the third information. Both the second information and the third information may be sent to the user. In one or more aspects, the method may further comprise receiving, from the application, a request for third information associated with the user, determining the application cache does not currently store the third information, receiving, from the server, the third information and a second time-to-live value, storing, in the application cache, the third information and the second time-to-live value, and sending, to the application, the third information.

Additionally or alternatively, a computer-implemented method may comprise receiving, at a data store, a data stream comprising information in fields; receiving, at a server, the data stream; determining, at the server and from the fields in the data stream, one or more time-to-live (TTL) values associated with the fields; and storing, in an application cache, the information and the one or more TTL values associated with the information, wherein the one or more TTL values are based on one or more fields of the information. The computer-implemented method may also comprise deleting, based on an expiration of a first TTL value associated with first information, the first information from the application cache; receiving, from an application, a request for the first information of a first field, related to a user, and second information of a second field, related to the user; determining, at the application cache, that the second information of the second field, of the user, is currently stored in the application cache; and sending, based on a determination that the second information in the second field of the user is currently stored in the application cache, the second information to the application.

In one or more additional aspects, the method may further comprise determining, at the server and from the data stream, a third field comprises third information; determining, at the server, a fourth field is currently stored; updating, based on the third information, the fourth field; and storing an updated TTL value associated the fourth field. The third information may be associated with a change in an account balance of the user, the fourth field may be an account balance, and updating the current account balance of the fourth field may result in an updated account balance.

In further aspects, the method may comprise determining, at the application cache, that the first information, of the user, is not currently stored in the application cache; sending, to the data store and based on a determination that the first information of the user is not currently stored in the application cache, a request for the first information in the first field associated with the user; receiving, from the data store, the first information associated with the first field; determining, based on the first field, a second TTL value for the first information received from the data store; storing, in the application cache, the first information in the first field and the second TTL value; and sending the first information to the application.

In some examples, the first TTL value and the second TTL value may be the same while, in other examples, they may be different. The lifespan of a TTL value may be determined by determining, from a table and for the first field, the first TTL value associated with the first field; and determining, from the table and for the second field, a second TTL value associated with the second field. In further aspects, a third field in the data stream may be determined and, based on a determination of the third field in the data stream, the process may send, to the data store, a request for fourth information, associated with the user, in a fourth field. The method may further comprise receiving, from the data store, the fourth information, associated with the user, in the fourth field; determining, based on the fourth field, a second TTL value for the fourth information received from the data store; storing, in the application cache, the fourth information and the second TTL value; receiving, from the application, a request for the fourth information; and sending, to the application, the fourth information. In one or more examples, the third field may indicate a transaction associated with the user has been declined, a change in behavior of the user, or a change in an account balance of an account associated with the user. The fourth field may comprise a most recent transaction associated with an account of the user.

In some aspects, the method may further comprise determining, at the server and based on the fields in the data stream, updated second information is being received; and determining, from the data stream, that the updated second information has been received in its entirety. The sending the second information to the application may be delayed until after a determination that the entirety of the updated second information has been received by the application cache.

In some aspects, the method may further comprise receiving, at the application cache and for the user, a modification of the one or more TTL values to be associated with the fields from the data stream. The determining the one or more TTL values may comprise determining, based on the modification of the one or more TTL values for the user, one or more modified TTL values, for the information of the user, associated with the fields, and the storing the information and the one or more TTL values may comprise storing, in the application cache, the information, of the user, and the one or more modified TTL values.

An apparatus, in accordance with various aspects, may comprise one or more processors; and memory storing instructions that, when executed by the one or more processors, cause the apparatus to receive a data stream, wherein the data stream comprises information in fields; determine, from the fields in the data stream, time-to-live (TTL) values associated with the fields; store, in an application cache, the information and TTL values associated with the fields of the information; and delete, from the application cache, with a first TTL value associated with first information, and the first TTL value having expired, the first information from the application cache. The instructions may further cause the apparatus to receive, from an application, a request, wherein the request is for the first information of a first field, related to a user, and for second information of a second field, related to the user; determine that the first information, of the user, is not currently stored in the application cache and that the second information, of the user, is currently stored in the application cache; send, to a data store and based on a determination that the first information of the user is not currently stored in the application cache, a request for the first information associated with the user; receive, from the data store, the first information associated with the user; and send, to the application, based on a determination that the second information of the user is currently stored in the application cache and based on the received first information, the first information and the second information.

In one or more aspects, the instructions may further cause the apparatus to determine, based on the first field, a second TTL value for the first information received from the data store and store, in the application cache, the first information in the first field and the second TTL value. The first and second TTL values may be the same or different. The instructions may further cause the apparatus to determine, from the data stream, a third field comprising third information; determine a fourth field is currently stored; update, based on the third information, the current account balance in the fourth field to an updated balance; and store an updated TTL value associated with the updated account balance in the fourth field.

In one or more further aspects, the instructions may cause the apparatus to determine a third field in the data stream; based on a determination of the third field in the data stream, send a request for fourth information, associated with the user, in a fourth field; receive the fourth information, associated with the user, in the fourth field; determine, based on the fourth field, a second TTL value for the received fourth information; store the fourth information and the second TTL value; receive, from the application, a request for the fourth information; and send, to the application, the fourth information. In some examples, the fourth field may comprise a most recent transaction associated with an account of the user. In further examples, the third field may indicate a transaction associated with the user has been declined, a change in behavior of the user, or a change in an account balance of an account associated with the user. In additional examples, the third information may be associated with a change in an account balance of the user, the fourth field may comprise a current account balance, and the instructions may cause the apparatus to update, based on the third information, the current account balance of the fourth field, resulting in an updated account balance.

A non-transitory media storing instructions that, when executed by one or more processors, cause the one or more processors to perform steps comprising receiving, at a data store, a data stream comprising information in fields; receiving, at a server, the data stream; determining, from a table, a first TTL value associated with a first field of the fields and a second TTL value associated with a second field of the fields, wherein the first TTL value and the second TTL value are different; storing, in the application cache, first information in the first field and the first TTL value and second information in the second field and the second TTL value; and deleting, from the application cache and upon expiration of the first TTL value associated with the first stored information, the first stored information. The steps may further comprise receiving, from an application, a request for the first information, related to a user, and for the second information of the second field, related to the user; determining, at the application cache, that the second information of the second field, of the user, is currently stored in the application cache; and sending, based on a determination that the second information in the second field of the user is currently stored in the application cache, the second information to the application.

Processes for Prepopulating a Call Center Cache

Figure 9:
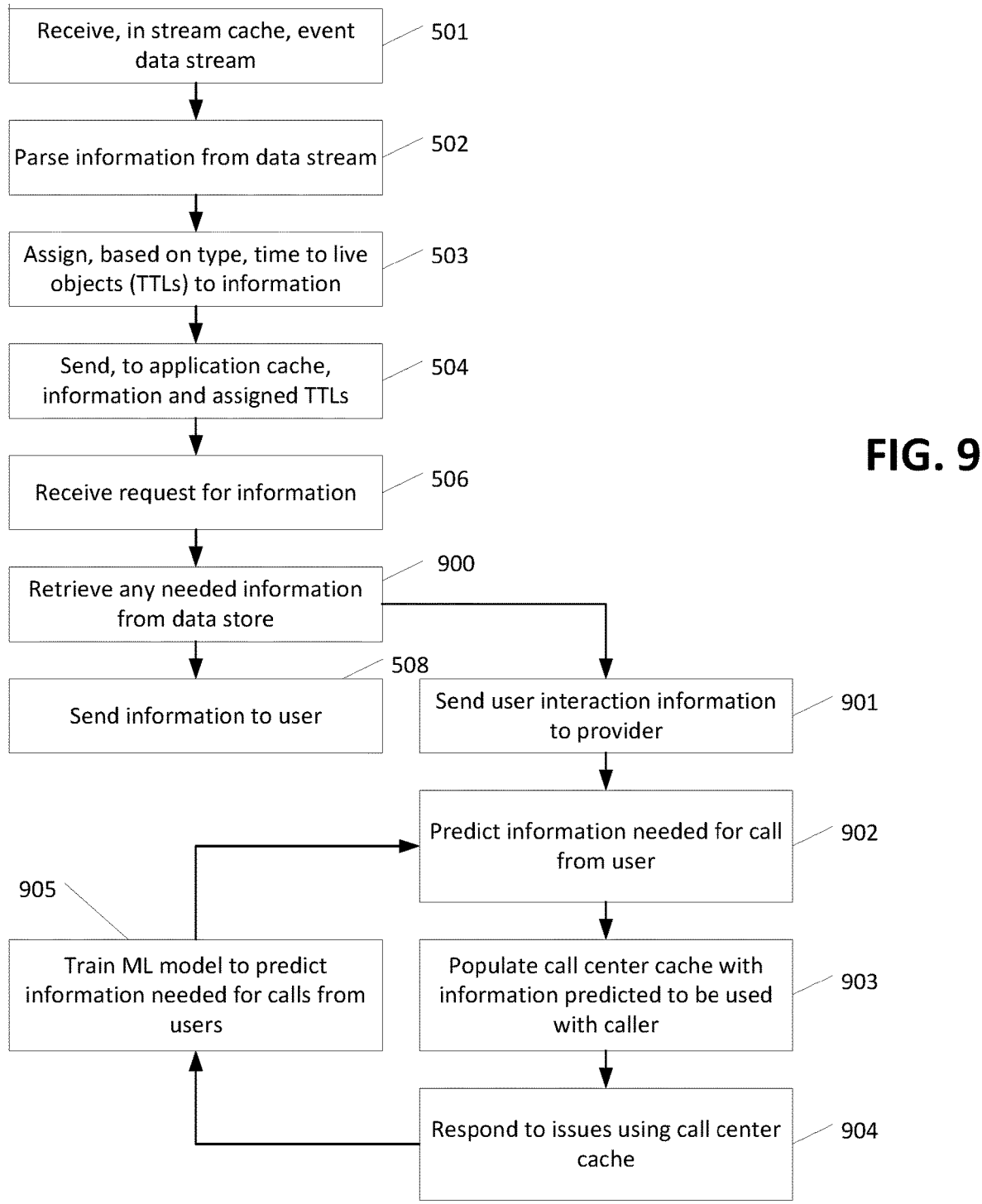
FIG. 9 depicts an example of using a machine-learning model to predict issues of users to be addressed by a call center.

FIG. 9 depicts an example of using a machine-learning model to predict issues of users to be addressed by a call center. Steps 501-506 and 508 of FIG. 9 correspond to steps 501-506 and 508, respectively, of FIG. 5. In step 900, the application cache retrieves any needed information from the data store. For example, the retrieval may comprise any of the approaches described herein including, but not limited to the approaches of FIGS. 5-7. In step 901, the application sends information regarding how the user has interacted with the application to a provider of the user's account (e.g., a bank, financial institution, merchant, and the like). In step 902, a trained machine-learning model is provided with the user's interactions with the application. Based on the user's interactions with the application and having been trained on previous interactions between users, their applications, and subsequent contacts made by those users with the topics addressed by the call center, the machine learning model predicts the subject matter and/or the information needed by the call center to respond to the user's inquiry. Based on that prediction in step 902, a call center cache may be populated (via step 903) with information relating to the predictions from step 902. In step 904, if, and when, the specific user contacts the call center, the individual or individuals responding to the specific user's inquiry address the specific user in step 904. The results and/or resolution of the specific user's inquiry may be forwarded from step 904 to step 905 where the machine learning model is further trained to improve its ability to predict if, and when, a user will contact the call center. The resulting newly trained machine learning model may be used to predict future information needed for call centers in step 902 based on future interactions of users with their applications.

Figure 10:
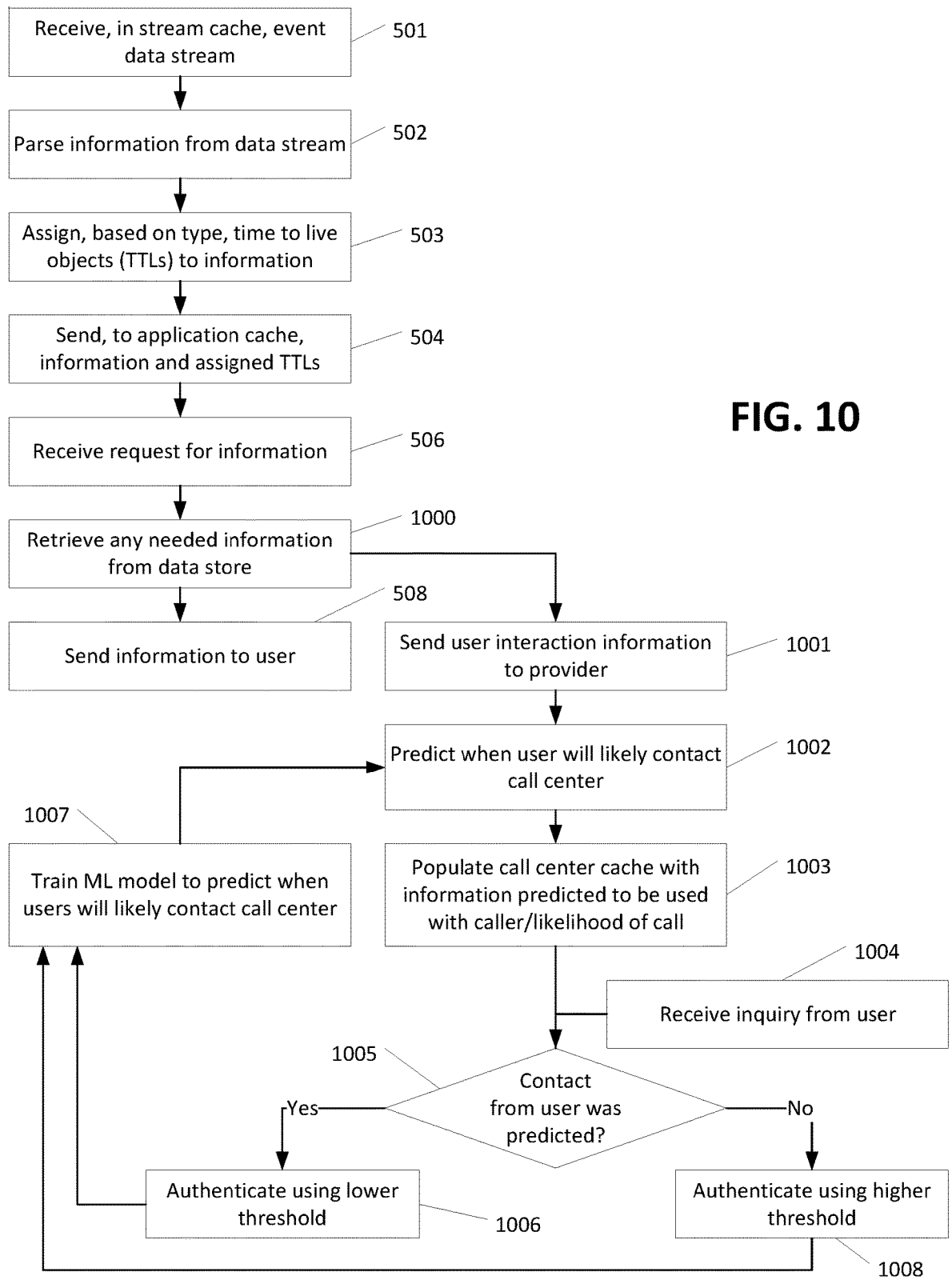
FIG. 10 depicts an example of using a machine-learning model to predict when users are likely to contact a call center.

FIG. 10 depicts an example of using a machine-learning model to predict when users are likely to contact a call center. Steps 501-506 and 508 of FIG. 10 correspond to steps 501-506 and 508, respectively, of FIG. 5. In step 1000, the application cache retrieves any needed information from the data store. For example, the retrieval may comprise any of the approaches described herein including, but not limited to the approaches of FIGS. 5-7. In step 1001, the application sends information regarding how the user has interacted with the application to a provider of the user's account (e.g., a bank, financial institution, merchant, and the like). In step 1002, a trained machine-learning model is provided with the user's interactions with the application. Based on the user's interactions with the application and having been trained on previous interactions between users, their applications, and subsequent contacts made by those users with the topics contacting the call center (e.g., within a given time window—for instance, within an hour, a day, a week, within a billing cycle, or the like), the machine learning model predicts when the user is expected to call and, possibly, the subject matter of the user's inquiry. Based on that prediction in step 1002, a call center cache may be populated (via step 1003) with information relating to the predictions from step 1002 including the likelihood a user will contact the call center based on the user's interactions with the application.

When a user contacts the call center, the degree of authentication required by the user may be modified based on whether the user was predicted to contact the call center in step 1002. Next, in step 1004, the system receives an inquiry from the user. The inquiry may include a chat request, a telephone call, a video call, email, other instant message, and/or contact via other medium or even in person at a physical location of the provider of the user's account. If the user's inquiry was predicted (determined in step 1005), the user may be authenticated in step 1006 using a lower authentication threshold (e.g., verifying one or two security items—e.g., last four digits of a social security number, home zip code, etc.). The results of the authentication in step 1006 and/or the user's inquiry may be provided to the machine-learning model and the machine learning model retrained in step 1007 using the new information. If the user's inquiry was not predicted (from step 1005), the user may be authenticated in step 1008 using a higher authentication threshold (e.g., verifying three or more security items). The number of security items per threshold is variable and may be increased or decreased as desired. The results of the authentication in step 1008 and/or the user's inquiry may be provided to the machine-learning model and the machine learning model retrained in step 1007 using the new information.

Based on the above, a computer-implemented method may comprise receiving, from an application, user interaction information; predicting, using a machine-learning model trained on previous interactions of previous users with their applications and with call centers and based on the received user interaction information, information expected to be needed by a call center when responding to an inquiry from the user; and populating a call center cache based on a prediction for the user. The method may also comprise storing, in an application cache and with a time-to-live value, first information for the application; monitoring a data stream of incoming information; detecting second information in the data stream; and storing, based on the detecting the second information, the second information in the application cache, wherein the second information overwrites the first information and refreshes the time-to-live value.

In one or more examples, the method may further comprise receiving interactions between the call center and the user; and retraining, based on the interactions between the call center and the user and based on the previous interactions of the previous users with their applications and with the call centers, the machine-learning model.

In additional aspects, the computer-implemented method may further comprise detecting third information in the data stream associated with the user, wherein the third information comprises information not currently stored in the application cache, and storing, based on the detecting the third information, the third information in the application cache, wherein the third information receives a second time-to-live value. The request may include a request for the second information and the third information. Both the second information and the third information may be sent to the user. In one or more aspects, the method may further comprise receiving, from the application, a request for third information associated with the user, determining the application cache does not currently store the third information, receiving, from the server, the third information and a second time-to-live value, storing, in the application cache, the third information and the second time-to-live value, and sending, to the application, the third information.

Additionally or alternatively, a computer-implemented method may comprise receiving, from an application, user interaction information; predicting, using a machine-learning model trained on previous interactions of previous users with their applications and with call centers and based on the received user interaction information, information expected to be needed by a call center when responding to an inquiry from the user; and populating a call center cache based on a prediction for the user. The method may also comprise receiving, from the application, a request for first information associated with the user; storing the first information in an application cache, wherein the application cache assigns a time-to-live value to the first information; monitoring a data stream of incoming information; detecting second information in the data stream; and storing, based on the detecting the second information, the second information in the application cache, wherein the second information overwrites the first information and refreshes the time-to-live value.

In one or more additional aspects, the method may further comprise receiving interactions between the call center and the user; and retraining, based on the interactions between the call center and the user and based on the previous interactions of the previous users with their applications and with the call centers, the machine-learning model.

In one or more additional aspects, the method may further comprise determining, at the server and from the data stream, a third field comprises third information; determining, at the server, a fourth field is currently stored; updating, based on the third information, the fourth field; and storing an updated TTL value associated the fourth field. The third information may be associated with a change in an account balance of the user, the fourth field may be an account balance, and updating the current account balance of the fourth field may result in an updated account balance.

In further aspects, the method may comprise determining, at the application cache, that the first information, of the user, is not currently stored in the application cache; sending, to the data store and based on a determination that the first information of the user is not currently stored in the application cache, a request for the first information in the first field associated with the user; receiving, from the data store, the first information associated with the first field; determining, based on the first field, a second TTL value for the first information received from the data store; storing, in the application cache, the first information in the first field and the second TTL value; and sending the first information to the application.

In some examples, the first TTL value and the second TTL value may be the same while, in other examples, they may be different. The lifespan of a TTL value may be determined by determining, from a table and for the first field, the first TTL value associated with the first field; and determining, from the table and for the second field, a second TTL value associated with the second field. In further aspects, a third field in the data stream may be determined and, based on a determination of the third field in the data stream, the process may send, to the data store, a request for fourth information, associated with the user, in a fourth field. The method may further comprise receiving, from the data store, the fourth information, associated with the user, in the fourth field; determining, based on the fourth field, a second TTL value for the fourth information received from the data store; storing, in the application cache, the fourth information and the second TTL value; receiving, from the application, a request for the fourth information; and sending, to the application, the fourth information. In one or more examples, the third field may indicate a transaction associated with the user has been declined, a change in behavior of the user, or a change in an account balance of an account associated with the user. The fourth field may comprise a most recent transaction associated with an account of the user.

In some aspects, the method may further comprise determining, at the server and based on the fields in the data stream, updated second information is being received; and determining, from the data stream, that the updated second information has been received in its entirety. The sending the second information to the application may be delayed until after a determination that the entirety of the updated second information has been received by the application cache.

In some aspects, the method may further comprise receiving, at the application cache and for the user, a modification of the one or more TTL values to be associated with the fields from the data stream. The determining the one or more TTL values may comprise determining, based on the modification of the one or more TTL values for the user, one or more modified TTL values, for the information of the user, associated with the fields, and the storing the information and the one or more TTL values may comprise storing, in the application cache, the information, of the user, and the one or more modified TTL values.

An apparatus, in accordance with various aspects, may comprise one or more processors; and memory storing instructions that, when executed by the one or more processors, cause the apparatus to receive, from an application, user interaction information; predict, using a machine-learning model trained on previous interactions of previous users with their applications and with call centers and based on the received user interaction information, information expected to be needed by a call center when responding to an inquiry from the user; and populate a call center cache based on a prediction for the user. The instructions may further cause the apparatus to store, in an application cache and with a time-to-live value, first information for the application; monitor a data stream of incoming information; detect second information in the data stream; and store, based on the detecting the second information, the second information in the application cache, wherein the second information overwrites the first information and refreshes the time-to-live value.

In one or more examples, the apparatus may further comprise instructions to determine, based on the first field, a second TTL value for the first information received from the data store; and store, in the application cache, the first information in the first field and the second TTL value. In one or more aspects, the instructions may further cause the apparatus to determine, based on the first field, a second TTL value for the first information received from the data store and store, in the application cache, the first information in the first field and the second TTL value. The first and second TTL values may be the same or different. The instructions may further cause the apparatus to determine, from the data stream, a third field comprising third information; determine a fourth field is currently stored; update, based on the third information, the current account balance in the fourth field to an updated account balance; and store an updated TTL value associated with the updated account balance in the fourth field.

In one or more further aspects, the instructions may cause the apparatus to determine a third field in the data stream; based on a determination of the third field in the data stream, send a request for fourth information, associated with the user, in a fourth field; receive the fourth information, associated with the user, in the fourth field; determine, based on the fourth field, a second TTL value for the received fourth information; store the fourth information and the second TTL value; receive, from the application, a request for the fourth information; and send, to the application, the fourth information. In some examples, the fourth field may comprise a most recent transaction associated with an account of the user. In further examples, the third field may indicate a transaction associated with the user has been declined, a change in behavior of the user, or a change in an account balance of an account associated with the user. In additional examples, the third information may be associated with a change in an account balance of the user, the fourth field may comprise a current account balance, and the instructions may cause the apparatus to update, based on the third information, the current account balance of the fourth field, resulting in an updated account balance.

A non-transitory media storing instructions that, when executed by one or more processors, cause the one or more processors to perform steps comprising receiving, at a data store, a data stream comprising information in fields; receiving, at a server, the data stream; determining, from a table, a first TTL value associated with a first field of the fields and a second TTL value associated with a second field of the fields, wherein the first TTL value and the second TTL value are different; storing, in the application cache, first information in the first field and the first TTL value and second information in the second field and the second TTL value; and deleting, from the application cache and upon expiration of the first TTL value associated with the first stored information, the first stored information. The steps may further comprise receiving, from an application, a request for the first information, related to a user, and for the second information of the second field, related to the user; determining, at the application cache, that the second information of the second field, of the user, is currently stored in the application cache; and sending, based on a determination that the second information in the second field of the user is currently stored in the application cache, the second information to the application.

Based on the above, a computer-implemented method may comprise receiving, from an application, user interaction information; predicting, using a machine-learning model trained on previous interactions of previous users with their applications and with call centers and based on the received user interaction information, a likelihood of a user of the application to contact a call center with an inquiry from the user; and populating a call center cache based on a prediction for the user to contact a call center. The method may further comprise authenticating the user based on the prediction for the user; storing, in an application cache and with a time-to-live value, first information for the application; monitoring a data stream of incoming information; detecting second information in the data stream; and storing, based on the detecting the second information, the second information in the application cache, wherein the second information overwrites the first information and refreshes the time-to-live value.

In one or more examples, the method may further comprise receiving interactions between the call center and the user; and retraining, based on the interactions between the call center and the user and based on the previous interactions of the previous users with their applications and with the call centers, the machine-learning model.

In additional aspects, the computer-implemented method may further comprise detecting third information in the data stream associated with the user, wherein the third information comprises information not currently stored in the application cache, and storing, based on the detecting the third information, the third information in the application cache, wherein the third information receives a second time-to-live value. The request may include a request for the second information and the third information. Both the second information and the third information may be sent to the user. In one or more aspects, the method may further comprise receiving, from the application, a request for third information associated with the user, determining the application cache does not currently store the third information, receiving, from the server, the third information and a second time-to-live value, storing, in the application cache, the third information and the second time-to-live value, and sending, to the application, the third information.

Additionally or alternatively, a computer-implemented method may comprise receiving, from an application, user interaction information; predicting, using a machine-learning model trained on previous interactions of previous users with their applications and with call centers and based on the received user interaction information, a likelihood of a user of the application to contact a call center with an inquiry from the user; and populating a call center cache based on a prediction for the user to contact a call center. The method may further comprise authenticating the user based on the prediction for the user; receiving, from the application, a request for first information associated with the user; storing, in the application cache and with a time-to-live value, first information for the application; monitoring a data stream of incoming information; detecting second information in the data stream; and storing, based on the detecting the second information, the second information in the application cache, wherein the second information overwrites the first information and refreshes the time-to-live value.

In one or more examples, the method may further comprise receiving interactions between the call center and the user; and retraining, based on the interactions between the call center and the user and based on the previous interactions of the previous users with their applications and with the call centers, the machine-learning model.

In one or more additional aspects, the method may further comprise determining, at the server and from the data stream, a third field comprises third information; determining, at the server, a fourth field is currently stored; updating, based on the third information, the fourth field; and storing an updated TTL value associated the fourth field. The third information may be associated with a change in an account balance of the user, the fourth field may be an account balance, and updating the current account balance of the fourth field may result in an updated account balance.

In further aspects, the method may comprise determining, at the application cache, that the first information, of the user, is not currently stored in the application cache; sending, to the data store and based on a determination that the first information of the user is not currently stored in the application cache, a request for the first information in the first field associated with the user; receiving, from the data store, the first information associated with the first field; determining, based on the first field, a second TTL value for the first information received from the data store; storing, in the application cache, the first information in the first field and the second TTL value; and sending the first information to the application.

In some examples, the first TTL value and the second TTL value may be the same while, in other examples, they may be different. The lifespan of a TTL value may be determined by determining, from a table and for the first field, the first TTL value associated with the first field; and determining, from the table and for the second field, a second TTL value associated with the second field. In further aspects, a third field in the data stream may be determined and, based on a determination of the third field in the data stream, the process may send, to the data store, a request for fourth information, associated with the user, in a fourth field. The method may further comprise receiving, from the data store, the fourth information, associated with the user, in the fourth field; determining, based on the fourth field, a second TTL value for the fourth information received from the data store; storing, in the application cache, the fourth information and the second TTL value; receiving, from the application, a request for the fourth information; and sending, to the application, the fourth information. In one or more examples, the third field may indicate a transaction associated with the user has been declined, a change in behavior of the user, or a change in an account balance of an account associated with the user. The fourth field may comprise a most recent transaction associated with an account of the user.

In some aspects, the method may further comprise determining, at the server and based on the fields in the data stream, updated second information is being received; and determining, from the data stream, that the updated second information has been received in its entirety. The sending the second information to the application may be delayed until after a determination that the entirety of the updated second information has been received by the application cache.

In some aspects, the method may further comprise receiving, at the application cache and for the user, a modification of the one or more TTL values to be associated with the fields from the data stream. The determining the one or more TTL values may comprise determining, based on the modification of the one or more TTL values for the user, one or more modified TTL values, for the information of the user, associated with the fields, and the storing the information and the one or more TTL values may comprise storing, in the application cache, the information, of the user, and the one or more modified TTL values.

An apparatus, in accordance with various aspects, may comprise one or more processors; and memory storing instructions that, when executed by the one or more processors, cause the apparatus to receive, from an application, user interaction information; predict, using a machine-learning model trained on previous interactions of previous users with their applications and with call centers and based on the received user interaction information, a likelihood of a user of the application to contact a call center with an inquiry from the user; and populate a call center cache based on a prediction for the user to contact a call center. The apparatus may further comprise instructions that cause the apparatus to authenticate the user based on the prediction for the user; store, in an application cache and with a time-to-live value, first information for the application; monitor a data stream of incoming information; detect second information in the data stream; and store, based on the detecting the second information, the second information in the application cache, wherein the second information overwrites the first information and refreshes the time-to-live value.

In one or more further aspects, the instructions may cause the apparatus to receive interactions between the call center and the user; and retrain, based on the interactions between the call center and the user and based on the previous interactions of the previous users with their applications and with the call centers, the machine-learning model.

A non-transitory media storing instructions that, when executed by one or more processors, cause the one or more processors to perform steps comprising receiving, from the application, user interaction information; and predicting, using a machine-learning model trained on previous interactions of previous users with their applications and with call centers and based on the received user interaction information, whether the user is expected to contact a call center; populating a call center cache based on a prediction for the user. The method may further comprise receiving an inquiry from the user; determining, based on the prediction from the machine-learning model and from the inquiry by the user, an authentication level to be used when authenticating the user; based on a determination of the authentication level, authenticating the user to the call center using the determined authentication level; receiving interactions between the call center and the user; and retraining, based on the interactions between the call center and the user and based on the previous interactions of the previous users with their applications and with the call centers, the machine-learning model.

Processes for Prepopulating a Cache Based on Previous Account Interactions

Figure 11:
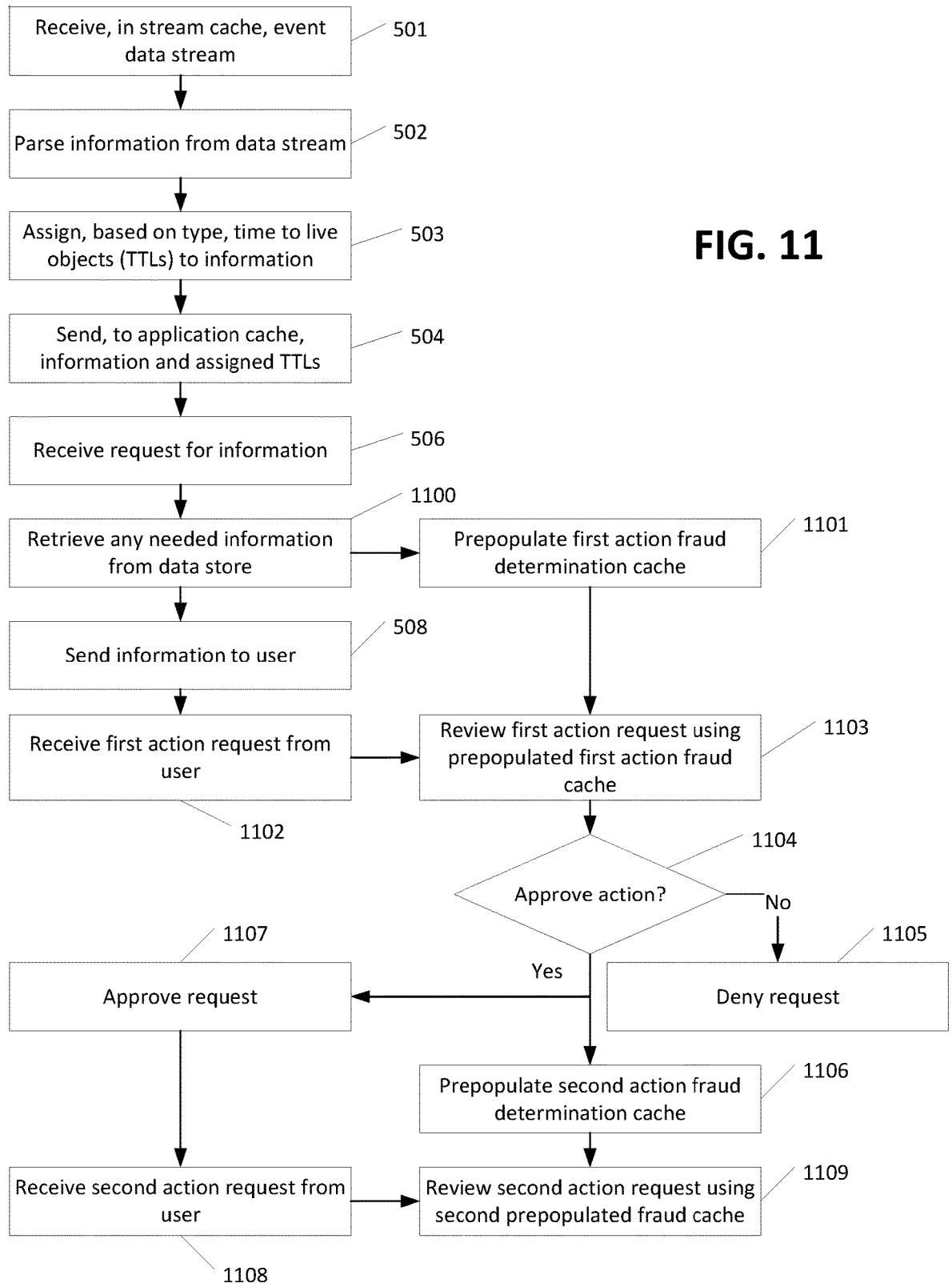
FIG. 11 depicts a block diagram showing various process flows for using interactions associated with a first cache to prepopulate a second cache.

FIG. 11 depicts a block diagram showing various process flows for using interactions associated with a first cache to prepopulate a second cache. FIG. 11 pertains generally to prepopulating one cache based on events that populated another cache. Steps 501-506 and 508 of FIG. 9 correspond to steps 501-506 and 508, respectively, of FIG. 11. In step 1100, the application cache retrieves any needed information from the data store. For example, the retrieval may comprise any of the approaches described herein including, but not limited to the approaches of FIGS. 5-7. In step 1101, information from the application cache is prepopulated into a first action fraud determination cache. In step 1102, the system receives a first action request from a user, where the first action request of step 1102 corresponds to the first action fraud determination cache that was prepopulated in step 1101. In step 1103, the system reviews the first action request (from step 1102) using the prepopulated first action fraud cache (from step 1101). In step 1104, the first action is approved or denied. If denied, the denial is provided to the user in step 1105. If approved, the system prepopulates a second action fraud determination cache is step 1106. Also, if approved, the approval is provided to the user in step 1107. In step 1108, the system receives a request for a second action from the user. Based on the request for the second action from step 1108 and the prepopulated second action fraud determination cache from step 1106, the system reviews the second action request in step 1109.

A use case associated with FIG. 11 includes addressing actions that, while related to each other, may be handled separately—e.g., checking for fraud in opening a new account may be independent from checking for fraud in conducting a transaction using an existing account. For example, when a fraudster acquires an authorized user's phone running the application, the fraudster may attempt to open multiple accounts based on the user's existing account. Opening a first new account may result in the population of a new account fraud determination cache. The opening of the second and additional accounts may access the content in the new account fraud determination cache, thus reducing the time for whether any second or subsequent new account requests are from the authorized user. If the fraudster is able to open one new account (with the subsequent requests being denied), the fraudster may attempt to initiate large transactions using that newly opened account. The process of FIG. 11 attempts to forestall the fraudster's new transaction by using the recently populated new account fraud determination cache to prepopulate a new transaction fraud determination cache. In other words, FIG. 11 uses the prepopulation of the first action cache (in step 1101) to prepopulate a second action cache (in step 1106) even though both caches may be accessed independently of each other.

In accordance with the examples described herein, a computer-implemented process may include receiving, by a server and from an application, first information from an application cache associated with the application. The process may include prepopulating a first action cache with at least some of the first information received from the application cache, receiving a first request, by the server and from the application, a first request comprising a request for performing a first action, and performing the first action. The process may include prepopulating, with second information and based on the performance of the first action, a second action cache with at least some of the first information from the first action cache, receiving a second request, by the server and from the application, a second request comprising a request for performing a second action, determining, by the server and based on the second information in the prepopulated second cache, whether to perform the second action, and based on a determination to perform the second action, performing the second action.

In additional examples, the method may additionally include storing the first information in the first action cache, wherein the first action assigns a time-to-live value to the first information and deleting, at an expiration of the time-to-live value of the first information, the first information from the first action cache. The method may include determining, based on receiving the first request from the application, whether to perform the first action, wherein performing the first action is based on a determination to perform the first action. The method may include receiving, by the server and from the application, a third request comprising a request for performing the first action, determining, by the server and based on the first information in the prepopulated first action cache, whether to perform the third request's first action, and based on a determination to not perform the third request's first action, denying the third request.

The first action may include opening a new account, and the first action cache may include a cache of information from which a determination of whether the first request for the first action is fraudulent. The second action may include performing a new transaction, and the second action cache may include a cache of information from which a determination of whether the second request for the second action is fraudulent.

The method may further include monitoring a data stream of incoming information, detecting user-specific information in the data stream associated with a user associated with the application, wherein the user-specific information may include a change to application information in an application cache associated with the application, storing, based on the detecting the user-specific information, the user-specific information in the application cache, wherein the user-specific information overwrites existing user-specific information and refreshes a time-to-live value associated with the user-specific information in the application cache, receiving, from the application, a request for the user-specific information associated with the user, and sending, to the application, the user-specific information.

The method may further include detecting second user-specific information in the data stream associated with the user, wherein the second user-specific information may include information not currently stored in the application cache, and storing, based on the detecting the second user-specific information, the second user-specific information in the application cache, wherein the second user-specific information receives a second time-to-live value, wherein the receiving the request for the user-specific information may include receiving a request for the user-specific information and the second user-specific information, and wherein sending the user-specific information may include sending, to the application, the user-specific information and the second user-specific information.

The method may include receiving, from the application, a request for third user-specific information associated with the user, determining the application cache does not currently store the third user-specific information, receiving, from the server, the third user-specific information and a third time-to-live value, storing, in the application cache, the third user-specific information and the third time-to-live value, and sending, to the application, the third user-specific information.

Some implementations described herein relate to an apparatus comprising one or more processors and memory storing instructions that when executed by the one or more processors cause the apparatus to populate an application cache with user-specific information from a data stream. The apparatus may be configured to receive, by a server and from an application, first information from an application cache associated with the application, wherein the first information may include at least some of the user-specific information. The apparatus may be configured to prepopulate a first action cache with at least some of the first information received from the application cache. The apparatus may be configured to receive a first request, by the server and from the application, a first request comprising a request for performing a first action. The apparatus may be configured to perform the first action. The apparatus may be configured to prepopulate, with second information and based on the performance of the first action, a second action cache with at least some of the first information from the first action cache. The apparatus may be configured to receive a second request, by the server and from the application, a second request comprising a request for performing a second action. The apparatus may be configured to determine, by the server and based on the second information in the prepopulated second cache, whether to perform the second action. The apparatus may be configured to, based on a determination to perform the second action, perform the second action.

In some examples, the apparatus may further include instructions to further cause the apparatus to store the first information in the first action cache, wherein the first action assigns a time-to-live value to the first information and delete, at an expiration of the time-to-live value of the first information, the first information from the first action cache.

In some examples, the apparatus may further include instructions to further cause the apparatus to determine, based on receiving the first request from the application, whether to perform the first action, wherein performance of the first action is based on a determination to perform the first action.

In some examples, the apparatus may further include instructions to further cause the apparatus to receive, by the server and from the application, a third request comprising a request for performing the first action, determine, by the server and based on the first information in the prepopulated first action cache, whether to perform the third request's first action, and based on a determination to not perform the third request's first action, denying the third request.

In some examples, the first action may include opening a new account. The first action cache may include a cache of information from which a determination of whether the first request for the first action is fraudulent. The second action may include performing a new transaction. The second action cache may include a cache of information from which a determination of whether the second request for the second action is fraudulent.

In some examples, the apparatus may further include instructions to further cause the apparatus to monitor the data stream for incoming information, detect new user-specific information in the data stream associated with a user associated with the application, wherein the new user-specific information may include a change to user-specific information in the application cache associated with the application, store, based on the detecting the user-specific information, the user-specific information in the application cache, wherein the user-specific information overwrites existing user-specific information and refreshes a time-to-live value associated with the user-specific information in the application cache, receive, from the application, a request for the user-specific information associated with the user, and send, to the application, the user-specific information.

In some examples, the apparatus may further include instructions to further cause the apparatus to detect second user-specific information in the data stream associated with the user, wherein the second user-specific information may include information not currently stored in the application cache, and store, based on the detecting the second user-specific information, the second user-specific information in the application cache, wherein the second user-specific information receives a second time-to-live value. The receiving the request for the user-specific information may include receiving a request for the user-specific information and the second user-specific information. The sending the user-specific information may include sending, to the application, the user-specific information and the second user-specific information.

In some examples, the apparatus may further include instructions to further cause the apparatus to receive, from the application, a request for third user-specific information associated with the user, determine the application cache does not currently store the third user-specific information, receive, from the server, the third user-specific information and a third time-to-live value, store, in the application cache, the third user-specific information and the third time-to-live value, and send, to the application, the third user-specific information.

The time-to-live value, the second time-to-live value, and the time-to-live value may be different from each other.

One more non-transitory media may store instructions that, when executed by one or more processors, cause the one or more processors to perform steps comprising receiving, by a server and from an application, first information from an application cache associated with the application, prepopulating a first action cache with at least some of the first information received from the application cache, receiving a first request, by the server and from the application, a first request comprising a request for performing a first action, determining, based on receiving the first request from the application, whether to perform the first action, based on a determination to perform the first action, performing the first action, prepopulating, with second information and based on the performance of the first action, a second action cache with at least some of the first information from the first action cache, receiving a second request, by the server and from the application, a second request comprising a request for performing a second action, determining, by the server and based on the second information in the prepopulated second cache, whether to perform the second action, and based on a determination to perform the second action, performing the second action.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, by a server and from an application of a remote user device, user interaction information;
   predicting, using a machine-learning model trained on previous interactions of other users with their applications on their user devices and with call centers and based on the received user interaction information, a likelihood of a user of the application to contact a call center with an inquiry from the user;
   populating a call center cache based on a prediction that the user will contact the call center;
   authenticating the user based on the prediction for the user;
   receiving a result of a user interaction between the user and the call center;
   storing, in an application cache of a server and with a time-to-live (TTL) value, first information for the application;
   monitoring a data stream of incoming information;
   detecting in the data stream, second information associated with user;
   storing, based on the detecting the second information, the second information in the application cache of the server, wherein the second information overwrites the first information and refreshes the TTL value;
   retraining the machine-learning model, wherein the retraining of the machine-learning model is based on:
     the previous interactions of the other users with their applications on their user devices and with the call centers;
     the received user interaction information; and
     the result of the user interaction between the user and the call center; and
   repopulating, based on the retraining of the machine-learning model, an updated prediction that the user will contact the call center, and the detection of the second information in the data stream, the call center cache.

2. The computer-implemented method of claim 1, further comprising:
   detecting third information in the data stream associated with the user, wherein the third information comprises information not currently stored in the application cache;
   storing, based on the detecting the third information, the third information in the application cache, wherein the third information receives a second TTL value;
   receiving a request, from the remote user device, for the second information and the third information; and
   sending, to the remote user device based on the request, the second information and the third information.

3. The computer-implemented method of claim 1, further comprising:
   receiving, from the application, a request for third information associated with the user;
   determining, based on the request, the application cache does not currently store the third information;
   receiving, from a data store, the third information and a second TTL value;
   storing, in the application cache, the third information and the second TTL value; and
   sending, based on the request, the third information from the application cache, and to the application, the third information.

4. A computer-implemented method comprising:
   receiving, by a server and from an application of a remote user device, user interaction information;
   predicting, using a machine-learning model trained on previous interactions of other users with their applications on their user devices and with call centers and based on the received user interaction information, a likelihood of a user of the application, associated with the received user interaction information, to contact a call center with an inquiry from the user;
   populating a call center cache based on a prediction that the user will contact the call center;
   receiving a result of a user interaction between the user and the call center;
   authenticating the user based on the prediction for the user;
   receiving, by the server and from the application, a request for first information associated with the user;
   storing, in an application cache of a server and with a first time-to-live (TTL), value, first information for the application;
   monitoring a data stream of incoming information;
   detecting second information in the data stream;
   storing, based on the detecting the second information, the second information in the application cache of the server, wherein the second information overwrites the first information and refreshes the first TTL value;
   retraining the machine-learning model, wherein the retraining of the machine-learning model is based on:
      the previous interactions of the other users with their applications on their user devices and with the call centers;
      the received user interaction information; and
      the result of the user interaction between the user and the call center; and
   repopulating, based on the retraining of the machine-learning model, an updated prediction that the user will contact the call center, and the detection of the second information in the data stream, the call center cache.

5. The computer-implemented method of claim 4, the method further comprising:
   receiving, by the server, a second request for third information associated with the user;
   determining, by the application cache, that the third information, of the user, is not currently stored in the application cache;
   sending, to a data store and based on a determination that the third information of the user is not currently stored in the application cache, a third request for the third information;
   receiving, based on the third request and from the data store, the third information associated;
   determining, based on the received third information, a second TTL value for the third information received from the data store;
   storing, in the application cache, the third information and the second TTL value; and
   sending, based on the second request and the third information received from the data store, the third information to the application.

6. The computer-implemented method of claim 5, wherein the first TTL value and the second TTL value are the same.

7. The computer-implemented method of claim 5, wherein the first TTL value and the second TTL value are different.

8. The computer-implemented method of claim 5, further comprising:
   receiving, by the application cache and for the user, a modification of the first TTL value associated with the first information from the data stream; and
   determining, based on the modification of the first TTL value, a third TTL value,
   wherein the storing the first information and the first TTL value comprises storing, in the application cache, the first information and the third TTL value, and
   wherein the storing the second information overwrites the first information and refreshes the third TTL value.

9. The computer-implemented method of claim 4, further comprising:
   storing, in the application cache, third information and a second TTL value;
   detecting, by the server and from the data stream, fourth information;
   updating, based on the fourth information, the third information; and
   storing, in the application cache and based on the updating, an updated second TTL value associated the updated third information.

10. The computer-implemented method of claim 9, wherein the third information is associated with a current account balance of the user, and
    wherein the fourth information comprises a change in the current account balance, and
    wherein updating, based on the fourth information, the current account balance results in an updated account balance.

11. The computer-implemented method of claim 4, further comprising:
    determining, from a table, the first TTL value associated with the first information.

12. The computer-implemented method of claim 4, further comprising:
    detecting, by the server, third information in the data stream;

based on a detection of the third information the data stream, sending, to a data store, a second request for fourth information, associated with the user;
receiving, based on the second request and from the data store, the fourth information;
determining, based on the fourth information, a second TTL value for the fourth information received from the data store;
storing, in the application cache, the fourth information and the second TTL value;
receiving, from the application, a third request for the fourth information; and
sending, based on the third request and to the application, the third information and the fourth information.

13. The computer-implemented method of claim 12, wherein the foruth information indicates:
a transaction associated with the user has been declined,
a change in behavior of the user, or
a change in an account balance of an account associated with the user.

14. The computer-implemented method of claim 12, wherein the fourth information comprises a most recent transaction associated with an account of the user.

15. The computer-implemented method of claim 4, further comprising:
determining, by the server and based on information in the data stream, updated second information is being received;
receiving, from the application, a second request for the second information;
determining whether the updated second information has been received in its entirety; and
sending, based on a determination that the entirety of the updated second information has been received and as the second information, the updated second information to the application.

16. An apparatus comprising:
one or more processors; and
memory storing instructions that, when executed by the one or more processors, cause the apparatus to:
receive, by a server and from an application of a remote user device, user interaction information associated with a user of the user device;
predict, using a machine-learning model trained on previous interactions of other users with their applications on their user devices and with call centers and based on the received user interaction information, a likelihood of the user of the application to contact a call center with an inquiry from the user;
populate a call center cache based on a prediction that the user will contact the call center;
authenticate the user based on the prediction for the user;
receive a result of a user interaction between the user and the call center;
store, in an application cache of a server and with a time-to-live (TTL) value, first information for the application;
monitor a data stream of incoming information;
detect second information in the data stream;
store, based on the detection of the second information, the second information in the application cache of the server, wherein the second information overwrites the first information and refreshes the TTL value;
retrain the machine-learning model, wherein the instruction to retrain of the machine-learning model are based on:
the previous interactions of the other users with their applications on their user devices and with the call centers;
the received user interaction information; and
the result of the user interaction between the user and the call center; and
repopulate, based on the retraining of the machine-learning model, based on an updated prediction that the user will contact the call center, and based on the detection of the second information in the data stream, the call center cache.

17. One or more non-transitory media storing instructions that, when executed by one or more processors, cause the one or more processors to perform steps comprising:
receiving, by a server and from an application of a remote user device, user interaction information;
predicting, using a machine-learning model trained on previous interactions of other users with their applications on their user devices and with call centers and based on the received user interaction information, a likelihood of a user of the application to contact a call center with an inquiry from the user;
populating a call center cache based on a prediction that the user will contact the call center;
authenticating the user based on the prediction for the user;
receiving a result of a user interaction between the user and the call center;
receiving, from the application, a request for first information associated with the user;
storing, in an application cache of a server and with a time-to-live (TTL) value, first information for the application;
monitoring a data stream of incoming information;
detecting second information in the data stream;
storing, based on the detecting the second information, the second information in the application cache of the server, wherein the second information overwrites the first information and refreshes the TTL value;
receiving a result of an interaction between the call center and the user;
retraining machine-learning model, wherein the retraining of the machine-learning model is based on:
the previous interactions of the other users with their applications on their user devices and with the call centers;
the received user interaction information, and
the result of the user interaction between the user and the call center; and
repopulating, based on the retraining of the machine-learning model, an updated prediction that the user will contact the call center, and the detection of the second information in the data stream, the call center cache.

* * * * *